(12) United States Patent
Varvello et al.

(10) Patent No.: US 10,819,789 B2
(45) Date of Patent: Oct. 27, 2020

(54) METHOD FOR IDENTIFYING AND SERVING SIMILAR WEB CONTENT

(71) Applicants: AT&T Intellectual Property I, L.P., Atlanta, GA (US); Northwestern University, Evanston, IL (US)

(72) Inventors: Matteo Varvello, Holmdel, NJ (US); Pengfei Wang, Shenyang (CN); Aleksandar Kuzmanovic, Evanston, IL (US)

(73) Assignees: AT&T Intellectual Property I, L.P., Atlanta, GA (US); Northwestern University, Evanston, IL (US)

( * ) Notice: Subject to any disclaimer, the term of this patent is extended or adjusted under 35 U.S.C. 154(b) by 130 days.

(21) Appl. No.: 16/009,338

(22) Filed: Jun. 15, 2018

(65) Prior Publication Data

US 2019/0387055 A1 Dec. 19, 2019

(51) Int. Cl.
*G06F 15/16* (2006.01)
*H04L 29/08* (2006.01)
*H04L 12/24* (2006.01)

(52) U.S. Cl.
CPC .......... *H04L 67/1097* (2013.01); *H04L 41/14* (2013.01)

(58) Field of Classification Search
CPC ...................... H04L 65/80; H04N 21/23439
See application file for complete search history.

(56) References Cited

U.S. PATENT DOCUMENTS

| | | | |
|---|---|---|---|
| 6,754,675 B2 | 6/2004 | Abdel-Mottaleb et al. | |
| 7,127,085 B2 | 10/2006 | Kim et al. | |
| 7,715,658 B2 | 5/2010 | Cho et al. | |
| 7,725,487 B2 | 5/2010 | Nadamoto et al. | |
| 7,836,053 B2 | 11/2010 | Naef et al. | |
| 7,869,657 B2 | 1/2011 | Podilchuk et al. | |
| 7,941,442 B2 | 5/2011 | Li et al. | |
| 8,224,849 B2 | 7/2012 | Li et al. | |
| 8,407,230 B2 | 3/2013 | Slaney et al. | |
| 8,914,736 B2* | 12/2014 | Cardasco | G06F 11/3006 715/760 |
| 8,949,254 B1* | 2/2015 | De Datta | G06F 16/93 707/751 |
| 9,141,849 B2 | 9/2015 | Kono et al. | |

(Continued)

FOREIGN PATENT DOCUMENTS

EP 3267368 A1 1/2018

OTHER PUBLICATIONS

Chen, et al., "A High-precision Duplicate Image Deduplication Approach", 2013, 8 pages.

(Continued)

*Primary Examiner* — Hieu T Hoang

(74) *Attorney, Agent, or Firm* — Guntin & Gust, PLC; John G. Rauch

(57) ABSTRACT

Aspects of the subject disclosure may include, for example, a method comprising receiving a request for content; retrieving the first portion of the content from an original source; retrieving an alternative portion, the alternative portion being a substitute for a second portion of the content; assembling an alternative presentation by combining the first portion and the alternative portion; and presenting the alternative presentation in response to receiving the request for content. Other embodiments are disclosed.

20 Claims, 21 Drawing Sheets

(56) References Cited

U.S. PATENT DOCUMENTS

| | | |
|---|---|---|
| 9,183,467 B2 | 11/2015 | Wang et al. |
| 9,251,223 B2 | 2/2016 | Chin et al. |
| 9,298,976 B2 | 3/2016 | Je et al. |
| 9,538,249 B2 | 1/2017 | Dankberg et al. |
| 9,800,690 B1* | 10/2017 | Clarke ................ H04L 67/2814 |
| 9,767,362 B2 | 11/2017 | Saklatvala |
| 2004/0255128 A1 | 12/2004 | Ohba |
| 2005/0015429 A1* | 1/2005 | Ashley ................... G06Q 30/02 709/200 |
| 2008/0028043 A1 | 1/2008 | Garbow et al. |
| 2010/0106732 A1 | 4/2010 | Atallah et al. |
| 2010/0161792 A1 | 6/2010 | Palm et al. |
| 2011/0022964 A1* | 1/2011 | Toebes ................... H04L 67/02 715/747 |
| 2011/0040852 A1* | 2/2011 | Sakhare ................... G06F 8/34 709/219 |
| 2013/0262704 A1 | 10/2013 | Jain |
| 2014/0136565 A1 | 5/2014 | Kim |
| 2014/0269269 A1* | 9/2014 | Kovvali ................ H04W 24/08 370/229 |
| 2015/0205755 A1* | 7/2015 | Gilbert .................... H04L 9/083 726/9 |
| 2016/0217343 A1 | 7/2016 | Hoffman et al. |
| 2016/0337426 A1* | 11/2016 | Shribman ........... H04L 65/4084 |
| 2016/0337475 A1 | 11/2016 | Sheppard |
| 2016/0364418 A1 | 12/2016 | Appleyard et al. |
| 2017/0289593 A1* | 10/2017 | Li ...................... H04N 21/2408 |
| 2017/0344657 A1 | 11/2017 | Liang |
| 2018/0129657 A1* | 5/2018 | Guest ................. G06F 3/04842 |
| 2018/0167486 A1* | 6/2018 | Pacella ............... H04L 67/2842 |

OTHER PUBLICATIONS

Dean, et al., "Finding related pages in the World Wide Web", 1999, 13 pages.

Hagen, et al., "Supporting more-like-this information needs: Finding similar web content in different scenarios", 2014, 12 pages.

Liu, et al., "A survey of content-based image retrieval with high-level semantics", 2006, 21 pages.

Niblack, et al., "QBIC project: querying images by content, using color, texture, and shape", 2004, 15 pages.

* cited by examiner

FIG. 1

METHOD FOR IDENTIFYING AND SERVING SIMILAR WEB CONTENT

FIELD OF THE DISCLOSURE

The subject disclosure relates to a method for identifying and serving similar web content.

BACKGROUND

The current Internet content delivery model assumes strict mapping between a resource and its descriptor, e.g., a JPEG file and its uniform resource locator (URL). Content Distribution Networks (CDNs) extend this model by replicating the same resources across multiple locations, and introducing multiple descriptors.

BRIEF DESCRIPTION OF THE DRAWINGS

Reference will now be made to the accompanying drawings, which are not necessarily drawn to scale, and wherein:

FIG. 1 depicts crowdsourcing user opinions on webpage alternatives.

DETAILED DESCRIPTION

Figure 2:
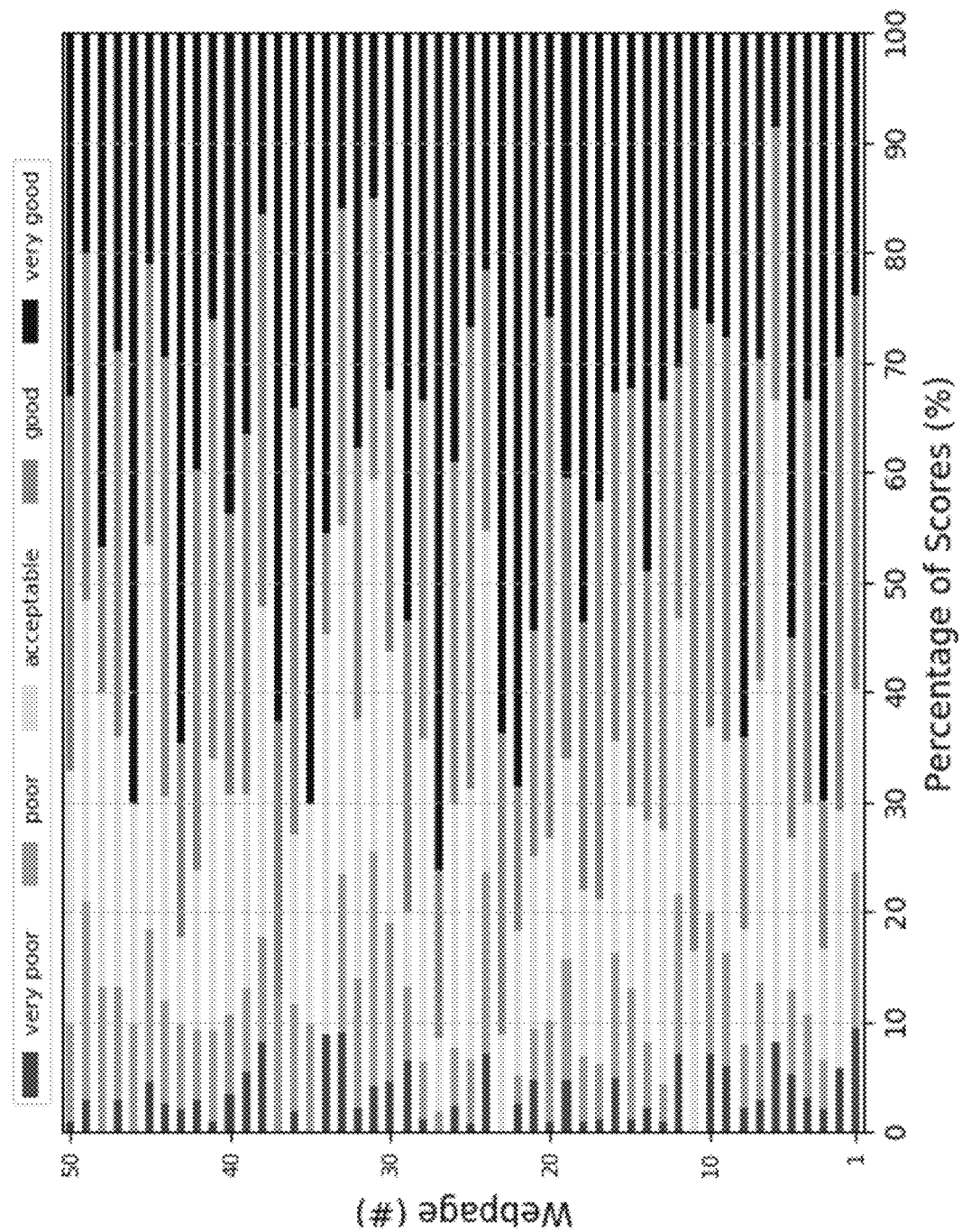
FIG. 2 depicts a visualization of user feedback on alternative websites.

The subject disclosure describes, among other things, illustrative embodiments for improving performance in presenting content, such as media content and/or other web content, by trading sameness of the media content for such performance. Other embodiments are described in the subject disclosure.

One or more aspects of the subject disclosure include receiving a request for content, the content including a first portion and a second portion, wherein the content is associated with an origin source of both the first portion and the second portion; retrieving, by the processing system, the first portion; retrieving, by the processing system, an alternative portion, the alternative portion being a substitute for the second portion; assembling, by the processing system, an alternative presentation by combining the first portion and the alternative portion; and presenting, by the processing system, the alternative presentation in response to receiving the request for content.

One or more aspects of the subject disclosure include an apparatus, comprising: a processor; and a memory that stores executable instructions that, when executed by the processor, facilitate performance of operations, comprising: detecting a request for content from an origin source, the content including a first portion and a second portion; retrieving the first portion; determining that retrieving the second portion from the origin source would take a first time period; determining that retrieving an alternative portion from an alternative source would take a second time period, wherein the alternative portion is related to, but different from, the second portion, and wherein the alternative source; responsive to determining that the second time period is less than the first time period, retrieving the alternative portion from the alternative source; assembling an alternative presentation by combining the first portion and the alternative portion; and presenting the alternative presentation in response to detecting the request for content.

One or more aspects of the subject disclosure receiving a request for content from an origin source, the content including a first portion and a second portion; retrieving the first portion; determining that retrieving the second portion from the origin source would take a first time period; determining that retrieving an alternative portion from an alternative source would take a second time period, wherein the alternative portion is related to, but different from, the second portion. In response to determining that the second time period is less than the first time period, retrieving the alternative portion from the alternative source; assembling an alternative presentation by combining the first portion and the alternative portion; and presenting the alternative presentation in response to receiving the request for content. In response to determining that the second time period is greater than the first time period, retrieving the second portion from the origin source; assembling an original presentation by combining the first portion and the second portion; and presenting the original presentation in response to receiving the request for content.

INTRODUCTION

High Quality of Experience (QoE) on the Internet is important for both content providers and end-users. QoE directly affects content providers' business revenues and clients' willingness to wait for and revisit a webpage. Amazon has reported that every 100 ms increase in page load time costs them 1% in sales. As a result, significant efforts have recently been made from both industry (e.g., QUIC, SPDY, and HTTP/2) and academia to design tools and novel protocols which can reduce page load times.

Despite these efforts, Content Distribution Networks (CDNs) are still the most valuable asset to speed up Web content delivery. CDNs move popular content close to the users by leveraging hundreds of thousands of servers distributed worldwide. To further improve user's QoE, CDNs redirect clients to different servers over a very short time scale by leveraging extensive network and server measurements.

While CDNs undoubtedly help content providers, only popular content providers can afford their services. We find that 64% of the top 1,000 websites—as indicated by Alexa—use one or multiple CDNs, while this fraction reduces to only 23% for the top 1 million websites. Yet, the same constraints regarding user experience and revenue loss for associated content providers hold for such websites. In a way, this creates a negative cycle where websites fail to attract clients due to their poor performance, yet improving performance depends on revenues from the clients.

Figure 1:
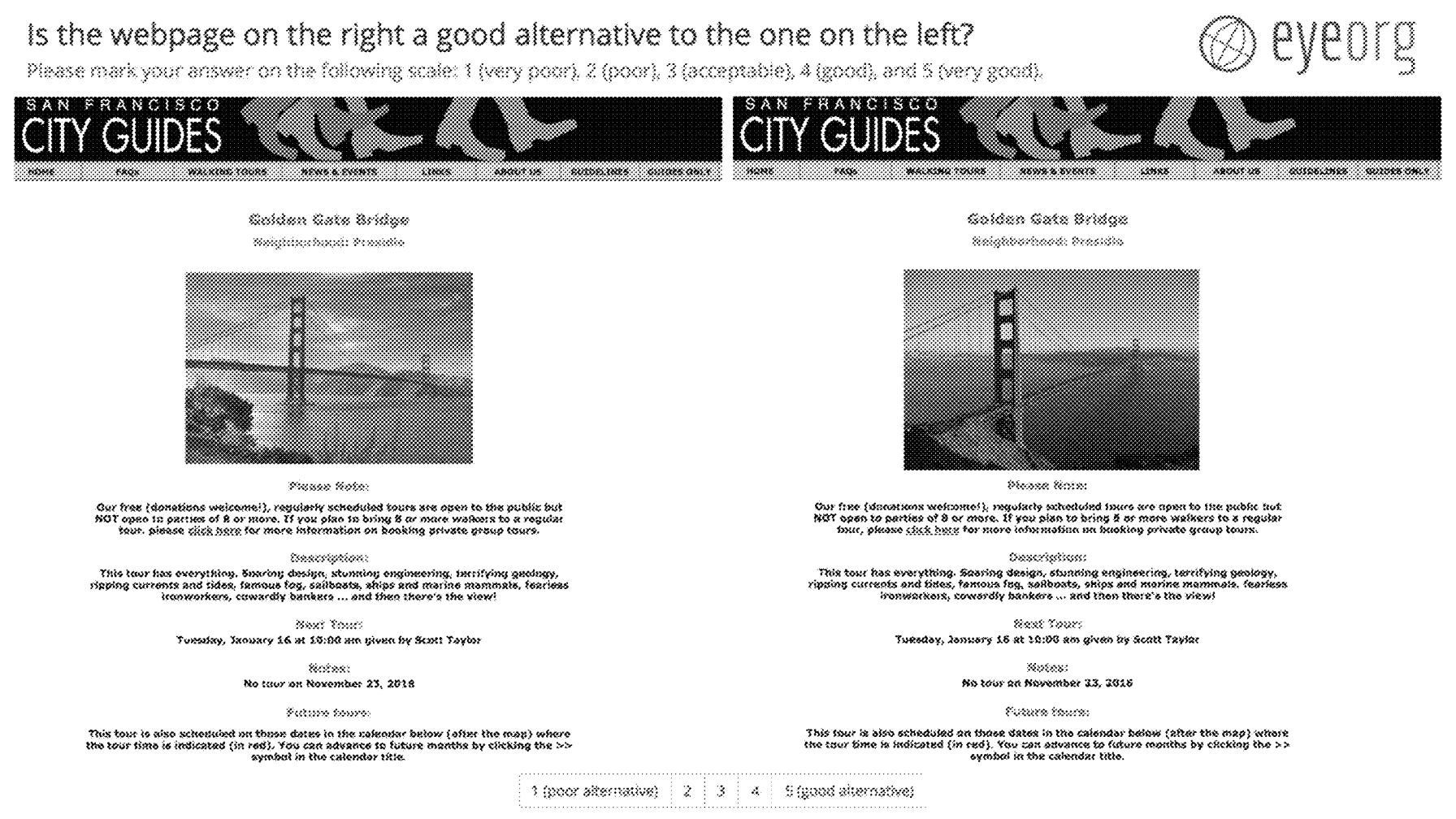

We propose a new content delivery model that aims at offering a CDN-like service with minimal cost, thus targeting as customers the majority of content providers that cannot afford CDN services. We propose to redirect user requests to a close by content replica. We propose to do so without a worldwide footprint to dramatically cut costs. In some embodiments, we trade content strictness for performance. By enabling users to download similar, yet not necessarily the same content they requested (e.g., a similar but not the same JPEG file as shown in FIG. 1), we expand the set of servers where such similar content can be fetched (turning the whole Internet into a single CDN).

Before digging into how to design and implement such a content delivery model, we explain why this model has potential. Specifically, we focus on its economic sustainability, technical feasibility, and potential for user adoption. We show both intuitive and less intuitive benefits for each actor involved in the model. Then, we quantify the magnitude of potential customers as well as content similarity on the Internet, two fundamental assumptions behind this model. Finally, we collect user feedback on whether users would accept similar webpages automatically generated by our algorithm (see FIG. 1). We collected 6,000 feedback from 1,000 people about 50 real websites, where both original and Web-LEGO-generated websites are shown to the participants of the study. Overall, 92% of the feedback indicate that a Web-LEGO-generated webpage is an acceptable (at least) alternative to the original webpage.

Next we design and deploy Web-LEGO, a system that realizes the content delivery model with no changes at Internet servers. Web-LEGO consists of a client and a server component. The client is a Web proxy that intercepts user requests and potentially replace Web content with alternative sources as instructed by the similarity storage server (3S). 3S stores URLs of similar resources for previously encountered objects/URLs. Such resources are discovered by the reverse file search server (RFSS) which—given an input Web object—identifies similar objects and their URLs, if available. Web proxy and 3S operate parallel with an application's flow, and are thus designed to meet strict timing requirements. RFSS works "offline" and it is thus less of a critical component. RFSS may focus on images, for which it may outsource its job to services like TinEye and Google Images, and on JavaScripts/CSS, for which we built our own reverse file search system.

We evaluate Web-LEGO using a testbed composed of a Chrome's client, Web-LEGO's proxy, 3S, and RFSS. We deployed Web-LEGO within a LAN and we used artificial delay, losses, and bandwidth throttling to evaluate a variety of network conditions. Our tests focused on a set of 100 websites randomly selected from Alexa's top 1,000 websites, which we divided into two subsets, one subset hosted on at least one CDN (CDN-hosted) and the other not (CDN-less). For each website under test we computed its page load time (PLT), as reported by Chrome, as well as its user-perceived page load time (uPLT), as crowdsourced on Eyeorg.

Our results show that Web-LEGO brings significant improvements both in terms of reduced PLT (up to 5.5 seconds), and user-perceived PLT (up to 5 seconds). Necessarily, CDN-less websites provide more room for speedup than CDN-hosted ones, i.e., 7× more in the median case. Despite generating additional traffic from alternative sources, our results demonstrate that Web-LEGO provides clear performance and economic benefits for both broadband wireline and wireless networks. We further show that a more considerate Web-LEGO's design may be useful for bandwidth-constrained networks, i.e., 3.5G and below, where excessive additional traffic can bring more harm than gain. Last but not least, Web-LEGO achieved these results without compromising visual accuracy, i.e., 94.2% of the replaced images convey equal or similar information to their original counterpart.

Webpage Load Optimization

Speeding up webpages is both an attractive research problem and a clear business goal for many companies. Accordingly, both research and industry have largely contributed with several interesting solutions, some already adopted today (HTTP/2, QUIC, inlining, spriting, etc.), and some still in incubation (KLOTSKI, Shandian, and Polaris). Although different, these solutions all operate on a page dependency graph, which captures "load-before" relationships between a page's key elements: HTML, CSS, JavaScript, and images.

KLOTSKI is a system that aims at improving user experience by prioritizing the content most relevant to a user's preferences. This is achieved by a back-end that measures webpages to capture key invariant characteristics within the dependency graph, and a front-end proxy that prioritizes high-utility content based both on the graph's characteristics and user's preferences.

Shandian is another system whose goal is to remove the intrinsic inefficiencies of webpage loads, e.g., time wasted by a browser blocking due to parsing the resources to be loaded. Shandian removes such inefficiencies by directly manipulating the dependency graph, i.e., controlling what portions of the page and in which order they are communicated to the browser. To deploy this approach transparently to webpages, Shandian requires a split-browser architecture and fulfill part of the page load on a proxy server, which can be either part of the web service itself (e.g., reverse proxies) or third-party proxy servers (e.g., Amazon EC2).

Netravali et al. notice that a browser is only partially informed of a page's dependency graph. For example, in order to avoid violating a potential dependency among two JavaScript files, the browser is forced to load them synchronously. With the goal to minimize such wasted times, they propose fine-grained dependency graphs with no missing edges. This is achieved via Polaris, which consists of 1) a dynamic client-side scheduler that is written in JavaScript and runs on unmodified browsers, 2) a fully automatic compiler that can translate normal pages into ones that load themselves with Polaris. Web-LEGO is orthogonal to these approaches, as it does not intervene on the dependency graph, but rather finds alternative sources for objects within this graph.

Web User Experience

Originally, the user experience on the Web was measured using simple metrics like time-to-first-byte and onLoad( ), i.e., a browser event indicating that "all of the objects in the document are in the DOM, and all the images, scripts, links and sub-frames have finished loading". Modern webpages are however a complex collection of hundreds of different objects, and such metrics struggle in representing the actual user experience. This has motivated a surge of interest in better understanding user experience on the Web. New metrics have been introduced, such as SpeedIndex, as well as new systems to crowdsource Web QoE. In this work, we use one of such systems to evaluate the impact of Web-LEGO on user experience. In the following we discuss existing work in the area of crowdsourcing Web QoE and what made us choose one of these systems for our evaluation.

To the best of our knowledge, Eyeorg is the first system for crowdsourcing Web QoE measurements. To do so, it relies on videos of pages loading; participants comment on a video by either reporting which page loaded faster among two or by explicitly indicating the frame when they consider a page loaded—which the authors call user-perceived page load time (uPLT). Using videos of webpage loads allows to provide a consistent experience to all participants, regardless of their network connections and device configurations. Further, it allows to scale to thousands of users quickly by integrating with crowdsourcing platforms like Crowd-Flower.

A similar approach, called WebGaze, was proposed. Differently from Eyeorg, WebGaze does not allow the users to transition frame by frame before providing their uPLT. Instead, it only offers side-by-side comparison to evaluate which page seems faster. The authors extensively study the impact of different network conditions when loading webpages, a novel aspect that was not studied in Eyeorg. They find that on slow networks, PLT and uPLT are poorly correlated, while their correlation increases in faster networks.

SpeedPerception is a system conceptually similar to both Eyeorg and WebGaze. SpeedPerception has been used to study user experience on the top 500 Internet retailer websites. The main outcome of this study is that classic metrics used to represent user experience do not accurately represent human perception of a webpage speed. The key novelty of this work is a simple 3-variable-based machine learning model which explains about 90% of end-user choices.

We used Eyeorg to study the impact of Web-LEGO on the perceived user experience. We chose Eyeorg, instead of WebGaze and SpeedPerception, for two main reasons. First, because Eyeorg is the only system which allows users to identify the exact frame where a page was loaded, which is particularly important for Web-LEGO. Second, Eyeorg is largely customizable and allows to easily generate new experiment types. For example, in the coming section we discuss some motivation results obtained on Eyeorg with the introduction of a new experiment type.

A Novel Content Delivery Model

Web-LEGO is a system that realizes a novel content delivery model trading content strictness for performance. Before digging into classic system design and (performance) evaluation, it is paramount that we investigate the feasibility of this model. This requires discussing three main topics: 1) economic sustainability, 2) technical feasibility, and 3) user adoption. We dedicate the following subsections to each of the topics above.

Economic Sustainability

We consider a hypothetical scenario in which Web-LEGO is widely deployed, and argue that it brings a win-win-win-win solution to all parties involved in the content delivery ecosystem: clients, CDNs, CDN-less websites, and origin websites or websites whose content might be offered as an alternative by Web-LEGO. Clients and CDN-less websites directly benefit from Web-LEGO's page load time speedup. CDNs also directly benefit from Web-LEGO because of additional traffic and thus revenues increase. Conversely, there is no obvious benefit for origin websites; indeed, these websites are impacted by a cost increase due to either extra traffic to their servers or to the CDN they subscribe to.

While the economics behind each website are different and complex, there is one shared goal which directly relates to increased revenues: webpage ratings and search engines rankings. It is important to note that such webpage ratings and search engine rankings are impacted by traffic-based metrics such as comScore. It follows that Web-LEGO-induced traffic towards origin websites, helps their general ratings and search engine rankings, particularly in wide-adoption Web-LEGO scenarios.

Even in small-scale adoption scenarios, Web-LEGO could be deployed such that it directly improves the ranking of an origin website. To do so, each Web-LEGO's client would maintain a list of origin websites it has benefited from which it would occasionally access via a search engine of interest. Any such click directly improves the search engine ranking of an origin website. Each click is originated by a real client and interleaved with regular client browsing to avoid being considered click fraud.

Technical Feasibility

One principle of this new content deliver model is to help providers of not-so-popular websites who cannot afford CDNs. It is thus important to estimate how many websites are CDN-less and would indeed benefit from this new model. Table 1 shows the fraction of websites that are hosted by at least one CDN from the Alexa's top 100 up to Alexa's top 1 million websites. This data was obtained by querying whatsmycdn.com, a public service which reveals the underlying CDNs for an arbitrary URL. The Table shows that while the majority of popular websites are hosted by CDNs, e.g., 70-64.3% if we focus on the top 100 and 1,000 websites, only 22.9% of the Alexa top 1 million websites use at least one CDN. This suggests that about 80% of today websites could potentially benefit from Web-LEGO.

TABLE 1

Fraction of websites using CDN services as a function of website popularity (Alexa ranking).

| top-100 | top-1K | top-10K | top-100K | top-1M |
|---------|--------|---------|----------|--------|
| 70.0%   | 64.3%  | 49.3%   | 35.4%    | 22.9%  |

This new content deliver model is also based on the assumption that the Internet abounds of similar content. We investigate this assumption by extracting all image URLs embedded in 100 CDN-less webpages randomly selected from Alexa and searching for similar images using Google Images—whose reverse image search allows to locate similar images across billions entries. We find that Google Images returns at least 10 similar images for 92% of cases, and at least two similar images for 97% of cases. The procedure above was repeated also for 100 CDN-hosted websites and no significant difference was observed. This result suggests that indeed similar content is widely available on the Internet.

User Adoption

Web-LEGO is designed as an opt-in service, and its users are informed to be trading faster webpages for slightly different content. Estimating how many users would accept this compromise is hard, as it requires launching the service and attracting a substantial user-base. We thus resort to crowdsourcing to shed some light on this question.

We use Eyeorg to collect user feedback on whether Web-LEGO-generated webpages can be considered as alternatives to an original page, granted that they can be served faster. Thanks to the help of Eyeorg's creators, we generated a new experiment type where two snapshots (instead of videos) of fully loaded webpages are presented side by side (see FIG. 1). Prior to the test, participants are informed that the page on the right was automatically generated by our algorithm with the goal to be similar to the original one but faster. Participants are also informed that the text was not altered, and that only images have been potentially replaced. Participants are finally asked to rank the proposed alternative websites on a scale 1 (very poor), 2 (poor), 3 (acceptable), 4 (good), and 5 (very good).

Using the methodology above, we run an Eyeorg campaign where we ask each paid participants to score 6 side-by-side website comparisons. We recruited 1,000 users on CrowdFlower (total cost: $120), and collected 6,000 evaluations of 50 webpage comparisons, or about ~120 scores per webpage comparison. Paid participants are selected as "historically trustworthy," a CrowdFlower's feature which guarantees trustworthy participants at the cost of a longer recruitment time. We further discard participants with potential low quality, i.e., participants who skipped our detailed instructions, spent less than one second on a task, always provided the same score across six website comparisons, etc. Overall, this filtering accounts for about 7% of the paid participants.

FIG. 2 visualizes the scores collected for each webpage. Overall, the majority of the scores (92.5%) are positive, i.e., acceptable, good, or very good. On average, a website only had ~12% of the scores which were negative. We visually inspected websites where more than average low scores were observed, e.g., 25% for website-31. A recurrent pattern was observed: slightly different image sizes cause small variations to the page layout. Participants were able to spot these minor variations because of the two pages being displayed side-by-side which is necessary for the study but also an adversary condition for Web-LEGO which is not to be found in regular browsing. Overall, this study indicates that Web-LEGO is doing a good job in selecting alternative content. Further, it shows encouraging results with respect to the potential adoption of the novel content deliver model proposed in this paper.

Design and Implementation

This section presents the design and implementation of Web-LEGO, a concrete solution to enable a content delivery model trading content strictness for performance. In the remainder of this section, we first provide an overview of Web-LEGO, and then dig into the details of its implementation.

Design

Figure 3:
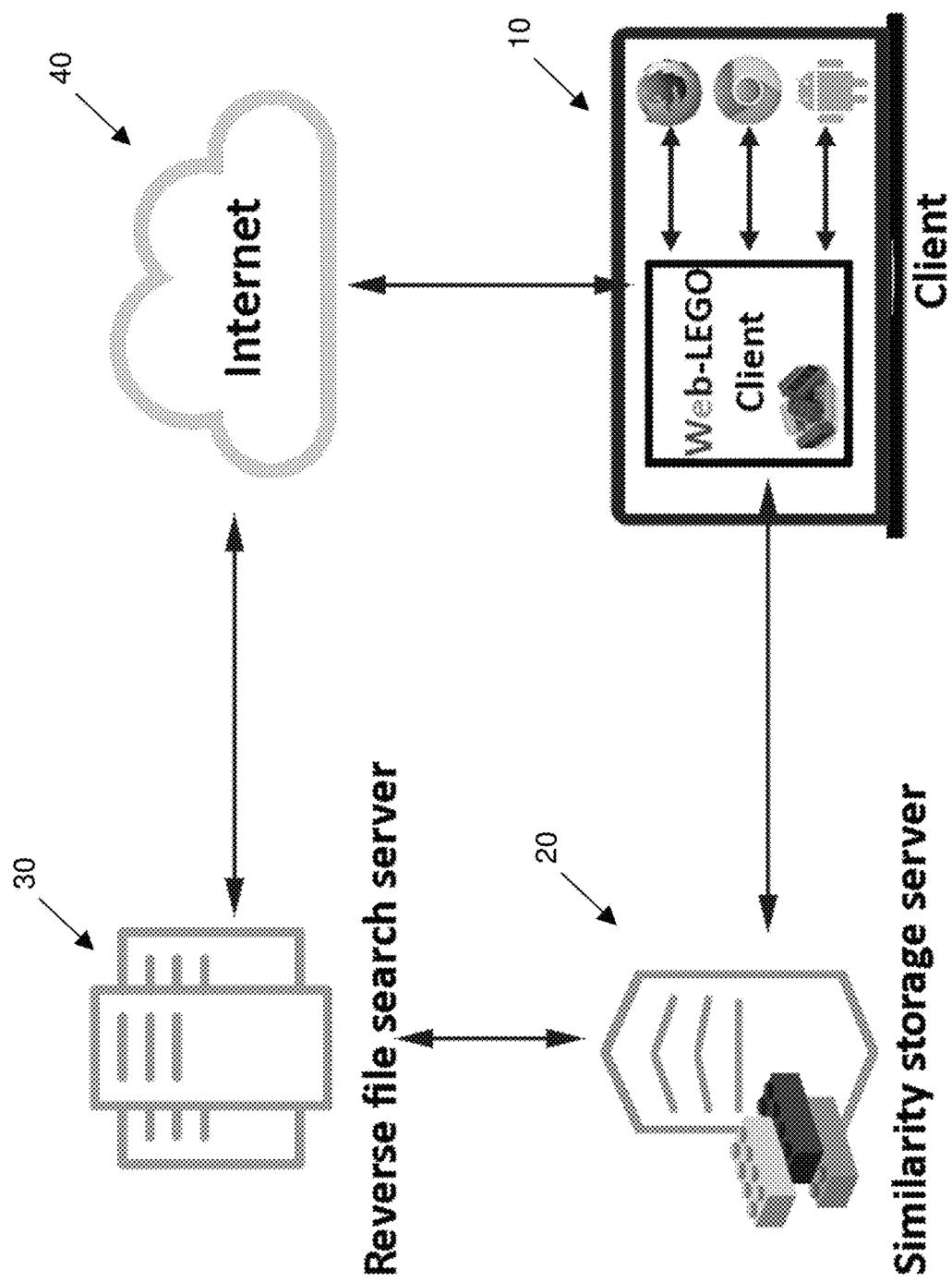
FIG. 3 is a block diagram illustrating an example, non-limiting embodiment of a system architecture in accordance with various aspects described herein.

FIG. 3 shows select Web-LEGO components: client 10, similarity storage server (3S) 20, and reverse file search server (RFSS) 30. The Web-LEGO's client 10 intercepts regular user requests and replaces them, if possible, with equal or similar content it has obtained from alternative sources. Such alternative sources are provided by 3S 20 which, very much like DNS, responds to Web-LEGO's client queries for extra content sources. Finally, the RFSS 30 collects similarity information, i.e., identify acceptable alternative content sources.

Web-LEGO's client may be setup to intercept Web requests generated by applications such as a browser or a mobile app (see FIG. 3). Each request is forwarded to its target server, like a transparent proxy would do. Additionally, requests for Web objects supported by Web-LEGO (images, JS, and CSS) are also forwarded to 3S, seeking for alternative sources.

Upon the reception of a content request (URL), 3S looks for such URL in its database. In case of a hit, N alternative sources for the requested content are provided. In case of a miss, a negative response is returned to the client while the original request is forwarded to the RFSS. The RFSS performs a reverse file search for this content, i.e., find alternative same or similar files, and return alternative URLs to 3S so that future requests for the same content will not result in another miss. Reverse file search is an active research area, and many operational systems exist in this domain. Among them, we utilize Google Images and TinEye; we detail our use of these services below.

Upon the reception of N alternative sources for some content, the Web-LEGO client attempts contacting each of them. Finally, whichever of the (N+1) requests—the original requests plus these N—completes first, its associated object is returned to the application. Note that the N extra requests for similar content pay an extra latency compared to the original request due to the communication with 3S; however, Web-LEGO aims at finding alternative content hosted on better provisioned and/or closer servers. Nevertheless, this latency should be minimized by placing 3S as close as possible to the Web-LEGO's client, e.g., co-location with DNS, as well as optimizing its lookup operation.

While Web-LEGO allows similar content use, the same cost vs. benefit trade-off holds for Web-LEGO and redundant requests. As an example, in some embodiments such as for a broadband wireline service, as long as Web-LEGO generates the benefit of at least 0.029 ms/KB, it pays off to send extra requests. For a mobile broadband plan, however, this benefit threshold may be higher (0.74 ms/KB) because the cost of such service is higher. While different networks may require different level of request replication, we find that sending up to 3 alternative requests is beneficial on broadband wireline and mobile networks alike.

Modern webpages contain hundreds of different objects such as HTML, JavaScript (JS), CSS, images, XHR, etc. Web-LEGO supports (i.e., attempt to replace) images, JS, and CSS files. The remainder object types might not be replaced (e.g., HTML) or require extra care (e.g., media objects). Substituting HTML content may be avoided since it can trigger the download of extra/unwanted content. Web-LEGO can handle media objects since they also share high similarity, e.g., two videos of the same event from a slightly different angle, and reverse video search services are indeed widely available. However, media objects further complicate the understanding of user QoE.

Web-LEGO may handle JS and CSS files differently than images. For images, Web-LEGO opportunistically attempts to replace them with the same or a similar content hosted elsewhere. For JS and CSS files, Web-LEGO may look for identical copies hosted at alternative servers. In fact, while two similar images can convey the same semantic meaning (see FIG. 1), even few different lines in JS/CSS can dramatically change the appearance and behavior of a website.

Web-LEGO Client.

We aim to implement a simple, fast, and robust client with the following features. First, it may be application-agnostic such that any Web application (e.g., browsers and mobile apps) can use it. Second, in some embodiments, it does not interfere with the regular flow of an application.

We implement the Web-LEGO's client as a client-side Web proxy. As such, it can simply be set as a system-wide proxy or specified within the application, if supported. By default, the Web-LEGO's client operates on HTTP traffic. If requested by the user, HTTPS traffic can also be handled by classic TLS interception. This may be realized by installing a custom root certificate on the client so that the Web-LEGO's proxy can create a certificate for itself claiming to be from the originating server and sign it with the custom root certificate. Assuming cooperation with the originating server, alternative approaches are secure key sharing like Cloud-Flare Keyless SSL, or more futuristic approaches that extend TLS to multiple parties.

While Web-LEGO may minimize the risk associated with TLS interception by running on the same machine as the originating application, the following precautions may be taken: 1) turn off HTTPS interception by default, 2) advise the user of the risk when installing a custom root certificate, 3) provide support for whitelisting, so that a user can specify the subset of HTTPS websites where Web-LEGO should intervene, e.g., only accelerate pages with no sensitive information. Web-LEGO's client is open source so that its code can be inspected for any privacy concern.

A recent study shows that 55% of the top-1M Alexa websites only support HTTP. With respect to CDN-less websites, our own (HTTP vs. HTTPS) measurements on a subset of randomly chosen 10,000 CDN-less websites among Alexa top-1M show that 68% of those are HTTP-only. This further suggests that Web-LEGO, which is tailored towards such CDN-less websites, is widely applicable even when constrained to HTTP traffic.

One goal of Web-LEGO is to speedup Web applications like browsers and mobile apps. It follows that the extra operations required, i.e., contact 3S and lookup extra resources, should have minimal impact on the regular application execution. One goal is thus to implement a multi-threaded proxy where the extra operations required are independent from the traffic relay operation. Beyond system-level concurrency, it is also essential to avoid the degradation of user-perceived performance due to the potential network congestion induced by added traffic. This issue was analyzed in depth in, showing that request replication is beneficial even under heavy load.

Figure 4:
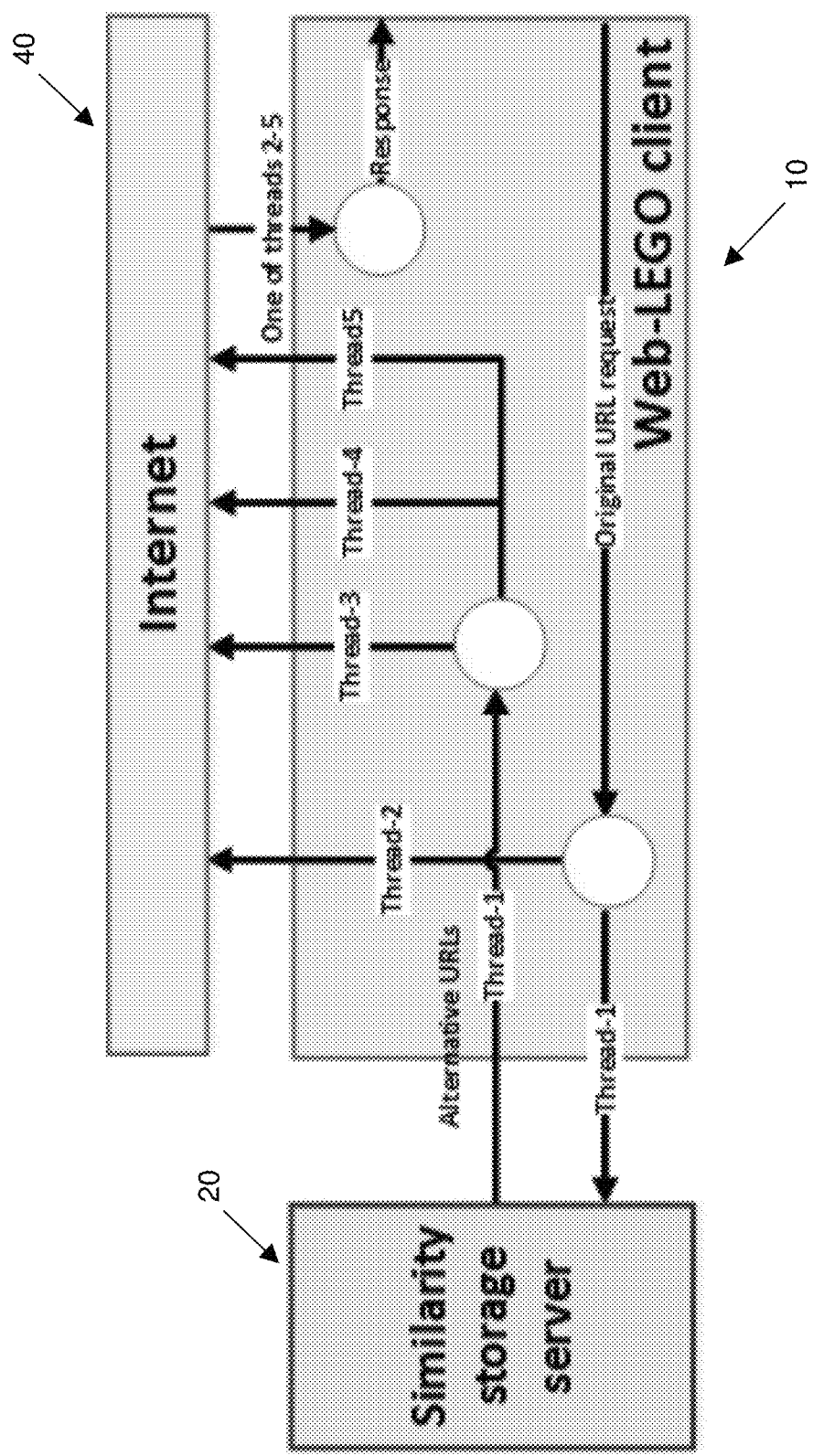
FIG. 4 depicts an example, non-limiting example workflow in accordance with various aspects described herein.

Accordingly, the Web-LEGO's client 10 may use a dedicated thread (thread-1 in FIG. 4) to relay HTTP traffic generated and received by an application. Such content requests are also shared with thread-2 which identifies if the content requested is suitable for replacement, i.e., it refers to an image, JS, or CSS. If a request is a candidate for replacement, thread-2 contacts the 3S requesting alternative resources. Assuming at least one source is returned, the Web-LEGO's client 10 starts a thread pool. For example, if three alternative sources are returned, the pool consists of thread-3, thread-4, and thread-5 (as shown in the figure), where each thread is responsible to fetch the desired resources. As discussed above, we limit the size of the thread pool to 1, 2, or 3, to evaluate performance in different networks. Eventually, the first result (out of four) that completes is sent to the application. We implemented Web-LEGO's client within goproxy, an HTTP/HTTPS proxy library written in Go which has native concurrency features.

Content Identification

A URL is often composed of four parts: protocol, hostname, pathname, and parameters. In many cases, the suffix of the pathname reveals the file type, e.g., ".png" suggests that the requested content is an image. In some cases, the URL does not unveil which content type is being requested; for example http://static1.squarespace.com/static/57311cc-8f85082142b0d30e5/t/5740e40637013bfb815f2cbc points to an image. To address this issue, the Web-LEGO's client analyzes the content received at the proxy to identify images, JS, and CSS, and propagate the pair <URL, type> to 3S. Obfuscated URLs, or URLs lacking file extensions in the suffix of their pathname, are always forwarded to the 3S where their type can now be retrieved. Finally, we omit sending to 3S advertisement URLs—detected via their hostnames—and social-network and other analytics.

3S 20 has three main functions: storing similarity information about Web objects, responding to Web-LEGO clients' requests, querying the RFSS and caching its responses. Using MongoDB, a scalable and flexible database system, we deploy a non-relational database to store information about URLs and their similarity. For each type (i.e., JS, CSS, and image) we created two collections, which are similar to tables in SQL, yet have no structure. One collection stores all URLs along with their attributes, e.g., for an image URL it stores its category (i.e., image), file size, width, length, type, CDN-flag (i.e., whether it is hosted at a CDN or not), etc. The second collection stores the similarity relationships among URLs.

URL Selection Algorithm.

Web-LEGO may limit the number of candidate URLs to replace a Web object to three, as discussed above. When more than three candidate URLs are available, some embodiments proceed as follows. First, we give highest priority to CDN-hosted URLs, i.e., URLs having the CDN-flag attribute set. For image URLs, we may prioritize identical images, then URLs for which the corresponding image dimensions are closest to the original image size. We find that the file type, e.g., png vs .jpg, does not pose a constraint for successful alternative webpage construction, because the CSS files handle the file types automatically. For JS and CSS files, given that the alternative CDN-hosted URLs point to identical content to the requested one, we may select them randomly.

Note that Web-LEGO may ignore URLs associated with images that have width or length smaller than 100 pixels. Such images may not have enough features for the reverse file search engine to return a same or similar image response. We finally return the top 3 URLs based on the ranking above.

URLs cached at the 3S server might become stale over time, i.e., they might no longer point to the desired content or point to different content. The first scenario is likely to happen over time, yet the consequences for Web-LEGO are not significant; in the worst case, the original content will still be served, because Web-LEGO always requests the original object. The second scenario, i.e., an existing URL pointing to a new object, is extremely unlikely. In either cases, regular automatic cleanups effectively resolve these issues.

Response Module.

To enable quick and efficient communication between Web-LEGO clients and 3S, the server may be hosted close to the clients. In a production system, we envision 3S to be co-located with local DNS servers. Currently, the communication between client and 3S may rely on a simple JSON-based protocol. It is worth noting that the protocol enables the client to set the category attribute (image, JS, or CSS) when it is known. In addition to enabling more efficient operations at the 3S, this method is used to inform the server about the object's type for obfuscated URLs, after the original resource is downloaded. UDP-based communication between Web-LEGO client and 3S may be used so to ease the co-hostability with local DNS.

RFSS may be used to identify alternative sources for an input Web object. This operation need not have a real-time constraint, as results are used to populate 3S's database for (eventual) future requests.

Although reverse image search is a well explored topic, building a reverse image engine is challenging. This is because it requires indexing billions of images and thus a significant engineering and monetary investment. There are two commercial services are available for reverse image search: TinEye and Google Images. While Google Images is free of use, for TinEye we purchased an API with a capacity of 10,000 searches. For each returned image, both engines also report their copyright. To avoid copyright infringement, Web-LEGO may be limited to "free to use or share" images.

Given an input image/URL, TinEye derives a fingerprint to find equal images within its database (billions of entries). Matching images are returned in the form of a public URL from where they can be downloaded. Instead, Google Images analyzes the input picture, e.g., by identifying objects and/or persons, and return a set of equal and similar images. For each input image, it also returns a tag, i.e., a set of keywords describing the content of the image. For example, the original picture in FIG. 1 (left) has tag "Golden Gate bridge."

Despite Web-LEGO users are informed to be trading performance for potentially different website appearances, our goal is to minimize website distortion. Underlying an image on a webpage there is an intent the webpage developer wanted to convey, and our goal is to provide an image which captures a similar message, e.g., the Golden Gate bridge from a different angle rather than a different bridge (see FIG. 1). Accordingly, for a given input image URL, we can query both TinEye and Google Images; we then rank the received images based on their similarity to the original input image. Equal images are ranked the highest; next, similar images are ranked based on how similar their tags are with the original image. Tags for alternative images (provided by Google) are retrieved by performing a reverse file search, and tag similarity between original and alternative image is expressed using cosine similarity. Whenever 3S asks for alternative images, RFSS will respond with same images first, then similar images with highest cosine similarities.

Given an input JS/CSS file, we use text snippets from these files to perform Google searches and locate corresponding alternative files. Once identical alternative files are found, their URLs is returned to 3S. For JS, two popular CDN-hosted JS frameworks are located: Google-hosted libraries and CDNJS libraries. For CSS, we instead find identical CSS files scattered around independent websites on the Internet.

Evaluation

This section evaluates Web-LEGO, our content delivery model which trades content strictness for performance. We start by introducing the metrics used throughout the evaluation, along with the experimental setup. Next, we focus on a characterization of Web-LEGO in terms of the number and type of Web objects replaced, considering both HTTP and HTTPS. We then evaluate its performance—using both automated tests and real users—when handling pages hosted on CDNs and not. We finally conclude the section investigating Web-LEGO's performance in constrained bandwidth conditions.

Metrics Throughout the evaluation, we use three main metrics: PLT, uPLT, and normalized benefit. The page load time (PLT) refers to when a browser returns the onload event. This metric may be used as a quick method to estimate the performance of a webpage. PLT has been recently criticized because unable to keep up with the evolution of the Web, e.g., it suffers from the presence of JS files. For this reason, we also use the user-perceived page load time (uPLT), or the time when a user considers a page "ready to use" as defined in.

Finally, we compare Web-LEGO's benefits with respect to the extra network traffic it introduces. We call normalized benefit the ratio between milliseconds (of improvement or deterioration) and KBytes (of extra traffic). We compute a webpage's performance improvement/deterioration as the difference between the PLT of the original webpage and its PLT when served via Web-LEGO. The extra traffic refers to the additional requests generated by the Web-LEGO's client in the attempt to retrieve (faster) equal or similar content.

Settings

We built a testbed composed of a Web-LEGO's client, 3S, and RFSS. The Web-LEGO's client runs on a high-end desktop machine (3.30 GHz, 4 cores, 8 GBytes of RAM) with fixed access (up to 100 Mbps6 in download and upload). The 3S and RFSS run on two regular server machines (3.50 GHz, 8 cores, 8 GBytes of RAM) located in the same LAN as the Web-LEGO's client, i.e., negligible network delay and packet losses. Artificial delay, losses, and bandwidth throttling are introduced using cell-emulation-util, a script based on Linux TC netem which allows to emulate real-world cellular networks based on traces provided by Akamai.

We selected two sets of 50 websites to be tested: CDN-hosted and CDN-less. Both sets were randomly selected from Alexa's top 1,000 websites based on whether they are hosted on a CDN or not, according to whatsmycdn.com. The number of websites under test was chosen to ensure we can collected reasonable feedback from real users.

We instrument Chrome via its remote debugging protocol to load a target website while collecting an HTTP Archive (HAR) file, i.e., JSON-formatted file logging a Web browser's interaction with a site. Each website is loaded directly and via the Web-LEGO's client; each load is repeated 5 times for 30 seconds while a video of the page loading is recorded. As suggested in, we ensure a fresh browser by cleaning Chrome state among runs, as well as a "primer" to populate eventual DNS (and 3S) caches at ISP level. We assume that Web-LEGO operates on both HTTP and HTTPS traffic, but we quantify the impact of operating just on HTTP traffic.

The recordings of website loads, realized with ffmpeg, are used for uPLT assessment. We use Eyeorg's timeline experiment where a participant is asked to "scrub" the video until when (s)he considers the page to be ready to use. For each website load (original and Web-LEGO) we show to paid participants the video whose PLT is closest to the median of the 5 loads. Each Eyeorg campaign targets 200 paid participants, who each evaluates 6 videos-thus generating 1,200 uPLT values or about 12 feedback per website's load (original and Web-LEGO).

Web Objects Characterization

Figure 5A:
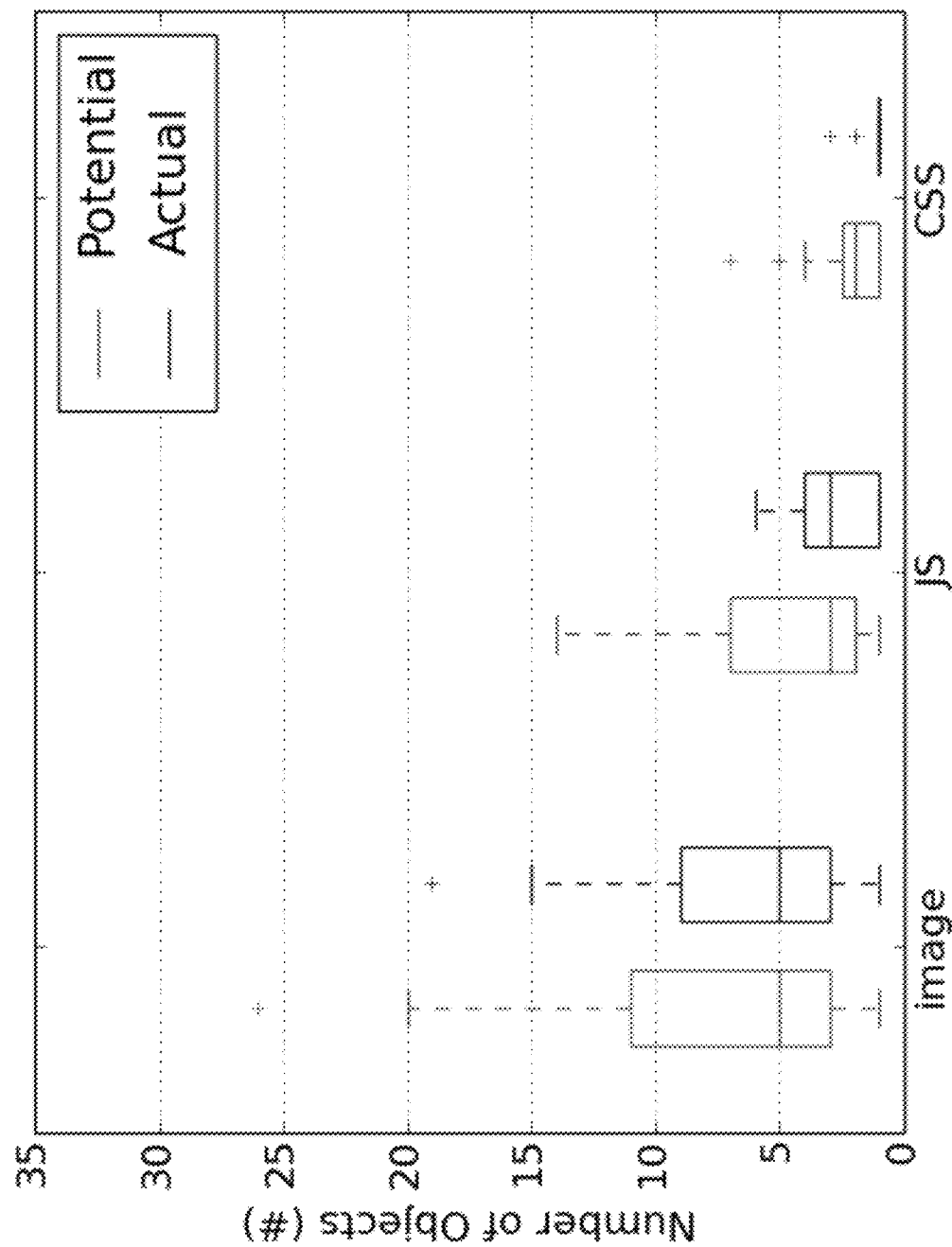
FIGS. 5A-5C depict boxplots of a number of potential and actual replacements as a function of the object type, differentiating between CDN-hosted and CDN-less websites.
Figure 5B:
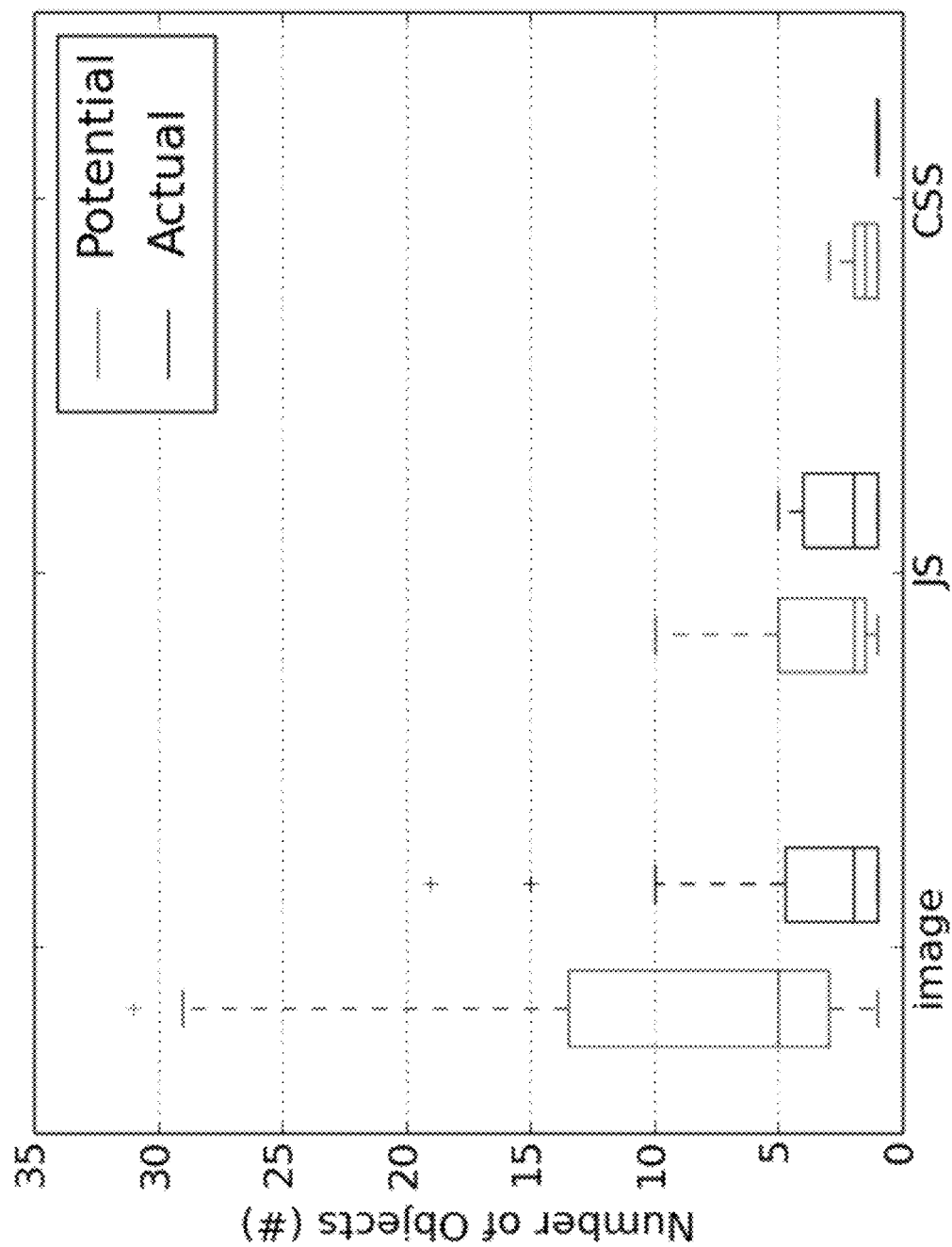

We start by analyzing which Web objects have potential for replacements and which ones were actually replaced in our experiments, i.e., served from alternative sources. FIGS. 5A and 5B show boxplots of the number of potential and actual replacements as a function of the object type (image, JS, CSS), differentiating between CDN-hosted and CDN-less websites. Regardless of whether a website is CDN-hosted or CDNless, image files hold the most potential for replacement, followed by JS and CSS files. For CDN-less websites, FIG. 5A shows that, most of the time, potential replacement translates into actual replacement, which means that the identified equal or similar content is received by the Web-LEGO's client faster than the original one. The same does not hold for CDN-hosted websites. FIG. 5B shows that while 50% of these websites contain at least 5 images with available candidate replacements, only one of these objects was actually replaced in the median case. This result is not surprising since CDNs are already optimized to serve content close to the user; indeed, this result further strengthens the importance of Web-LEGO for CDN-less websites.

Figure 5C:
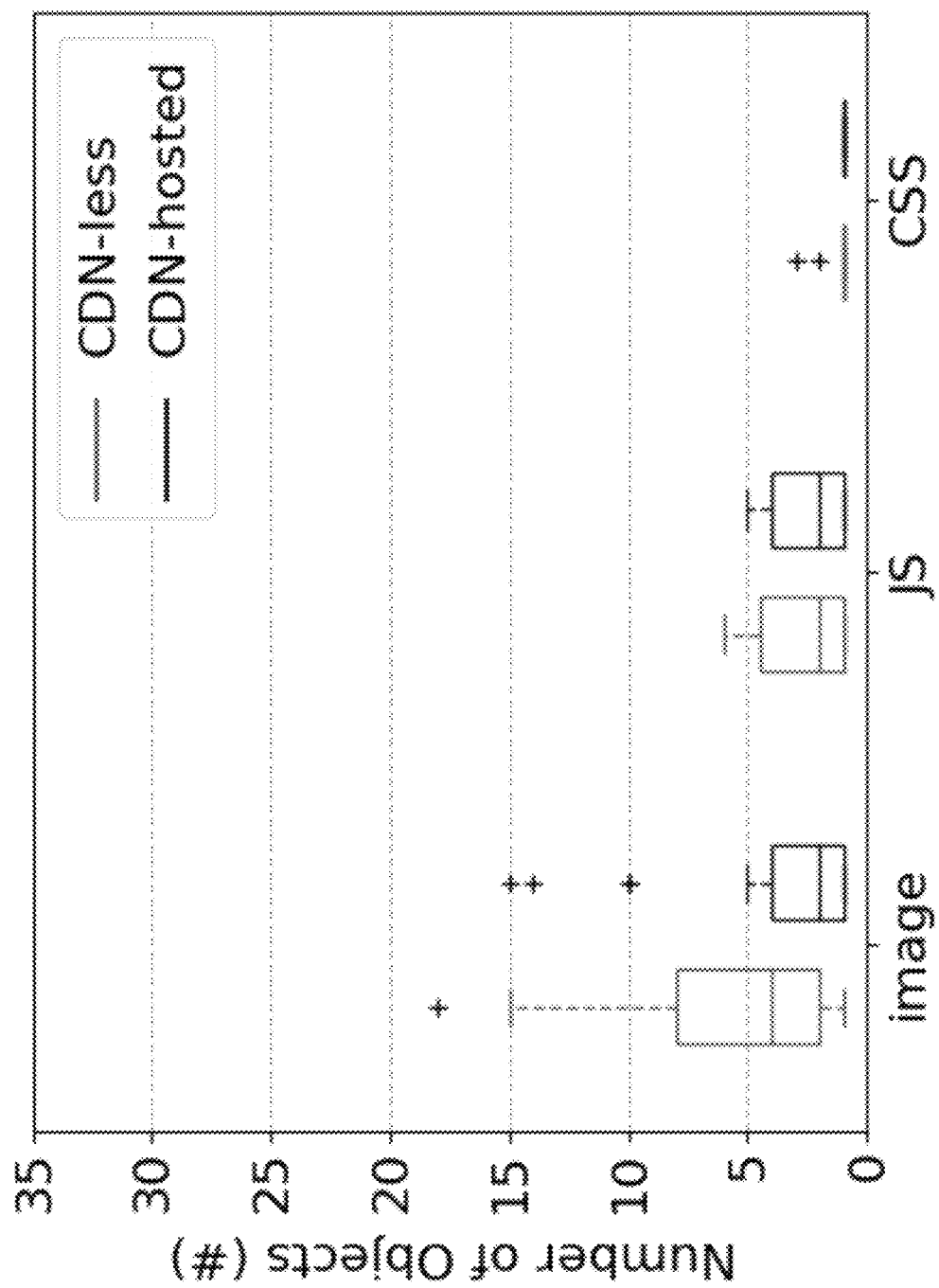

We now restrict our analysis to HTTP traffic, i.e., Web object transported using HTTP. Note that an HTTPS website could still include some HTTP objects, e.g., images obtained from a third party domain not supporting HTTPS. Similarly, an HTTP website might include some HTTPS objects. FIG. 5C shows that, as expected, the potential for replacement is reduced but there is still room for Web-LEGO to operate, especially for CDN-less website which are the sites Web-LEGO was designed for. This is a common problem of proxy-based solutions with the (justified) growth of HTTPS. However, Web-LEGO targets CDN-less websites with limited resources which are less likely to deploy HTTS. Further, Web-LEGO was designed to help such websites and solutions like CloudFlare Keyless SSL may be adopted.

For JS and CSS files, Web-LEGO leverages alternative files which are carbon copies of the original ones; alternative images can instead be either equal or similar—in terms of cosine similarity—to the original ones. For each original image (1,012 images when combining CDNhosted and CDN-less websites) we derive the highest rank available, i.e., equal or highest cosine similarity, and summarize the results in Table 2. The majority of the original images, 73.9%, have at least one equal alternative. Although not shown in the table, more than half (52.1%) of the original images have three equal alternative images: since Web-LEGO never attempts to replace an image with more than three alternative images (see Section 4), this means that half of the time the user would see no visual change in a Web-LEGO generated webpage. Further, an extra 11.9% of images have at least one very similar alternative image, i.e., cosine similarity mostly equal to one. Only 14% of the images have low similarity alternative images (cosine similarity <0.5) which have potential to distort the semantic of an original image.

TABLE 2

Similarity of original images and alternative ones; Metrics: cosine similarity and accuracy.

| | Equal | Similar (cosine similarity) | | | | None |
| --- | --- | --- | --- | --- | --- | --- |
| | | 1 | [0.8, 1) | [0.5, 0.8) | [0, 0.5) | |
| Ratio | 73.9% | 7.1% | 2.2% | 2.6% | 14.0% | 0.2% |
| Accu. | 100% | 92.4% | 86.1% | 78.9% | 70.3% | — |

Next, we quantify the accuracy of cosine similarity computed between image tags as an indicator of how visually similar two images are (Table 2, second row). To do so, we resort to visual inspection; we find that cosine similarity is a good visual similarity indicator, e.g., 92.4% of the images with perfect cosine similarity are visually similar to their original counterpart. Errors happen when the search engine doesn't correctly tag an input image, triggering the retrieval of bad alternative images which indeed share the (erroneous) tags with the input image. Accuracy decreases as we focus on images with lower cosine similarity; still, 70.3% of the images with cosine similarity ≤0.5 are visually similar to their original counterpart. By combining the first and the second row of Table 2, we can conclude that Web-LEGO has an average accuracy of 94.2%.

Baseline Network Experiments

Page Load Time

Figure 6A:
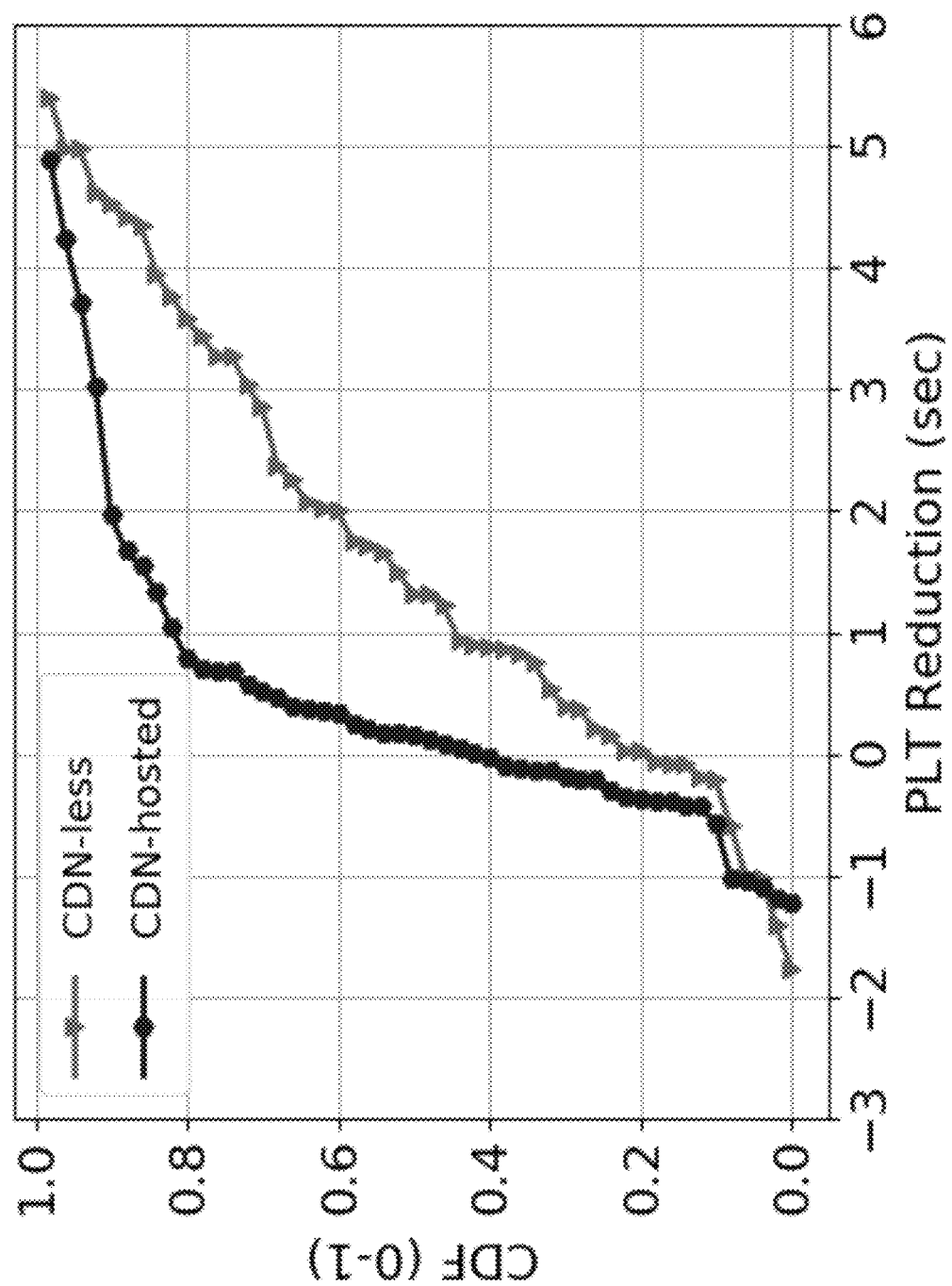
FIG. 6A-6C depict select performance evaluation plots in accordance with various aspects described herein.

We start by quantifying the improvements (or reduction) in PLT attainable with Web-LEGO when targeting CDN-less and CDN-hosted websites. We assume no artificial delay, losses, and bandwidth throttling. FIG. 6A shows the Cumulative Distribution Function (CDF) of the (median) PLT reduction for 50 CDN-less and 50 CDN-hosted websites, respectively. We compute the PLT reduction as the difference between the median PLT of an original webpage and its median PLT when served via Web-LEGO, i.e., positive values indicate good Web-LEGO's performance.

FIG. 6A shows that Web-LEGO reduces the PLT for 80% of the CDN-less websites, with reductions in the order of multiple seconds, i.e., up to 5.5 seconds. Significant PLT reductions are also available for 58% of the CDN-hosted websites. As discussed above, the observed lower benefits for CDN-hosted websites are expected due to the reduced opportunity of content replacement (see FIG. 5B). Web-LEGO causes PLT degradations (negative PLT reductions) for 20% of the CDN-less websites (10 websites) and 42% (21 websites) of the CDN-hosted websites; we analyze such PLT degradations next.

The PLT degradations for 6 of the 10 CDN-less websites impacted are <200 ms. Such values are, however, within the standard deviation of the PLT measured across 5 runs. It follows that their root causes might lie in non-Web-LEGO related causes such as high(er) load at one of the many servers involved during a webpage load. Conversely, for the remaining 4 websites we observe PLT degradation comprised between 0.6 and 1.7 seconds. HAR inspection suggests that in all cases, third-party ad servers, that Web-LEGO did not interfere with, were the root cause of the degradation.

User-Perceived Page Load Time.

Figure 6B:
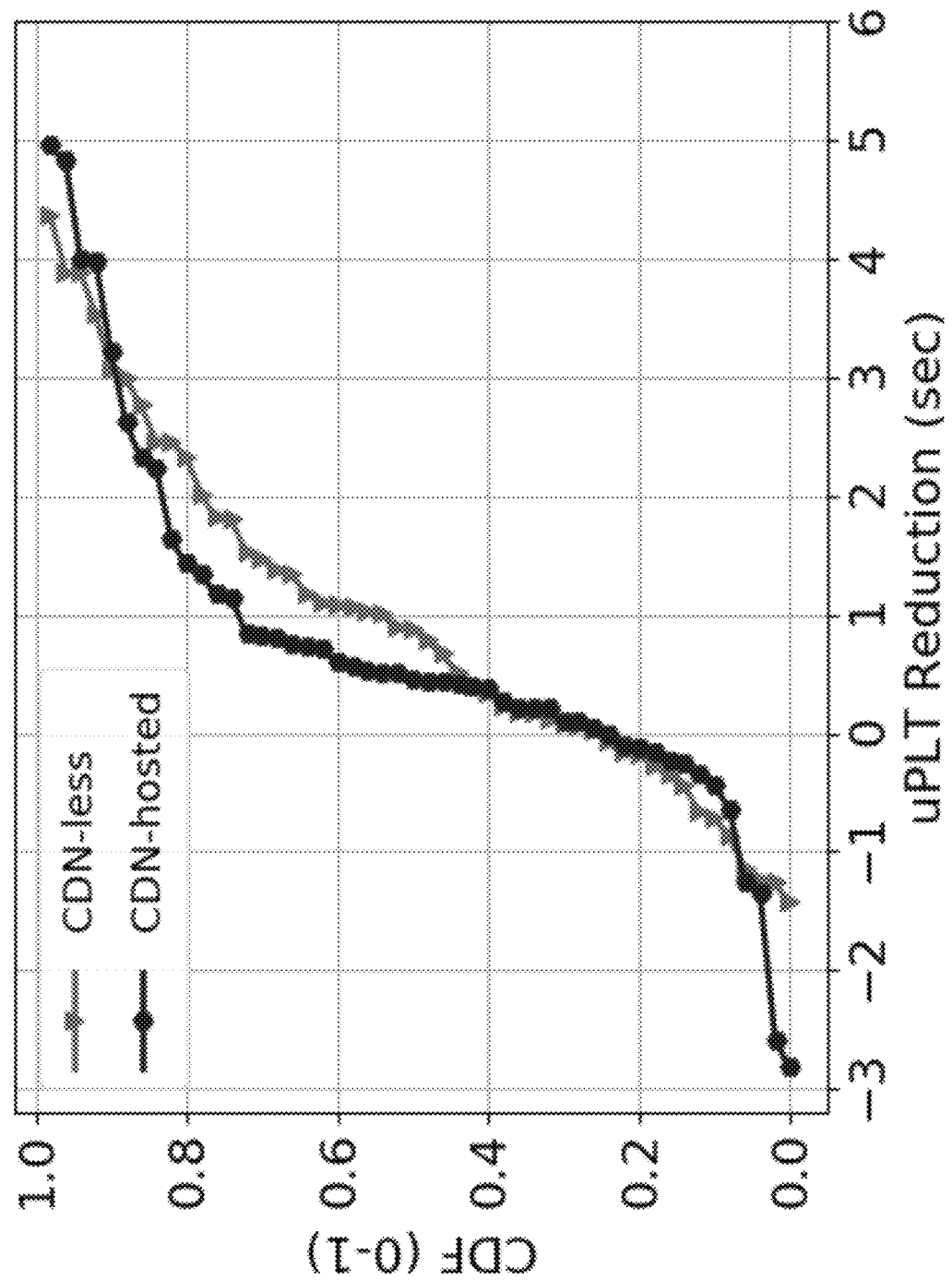

While PLT is useful to quantify how "fast" a webpage is delivered, it can be (easily) manipulated, for example by changing the order by which objects are delivered to the client. We thus set out to verify that Web-LEGO's performance improvements also hold in terms of uPLT, or how fast people perceive a webpage. Accordingly, FIG. 6B shows the CDF of the median uPLT for both CDN-less and CDN-hosted websites.

Differently from FIG. 6A, the figure shows a similar fraction of CDN-less and CDN-hosted websites (74%) for which users "perceive" an improvement thanks to Web-LEGO. This implies that the verdict of PLT is reverted for 6% of the CDN-less websites, which are felt slower by real users than what PLT indicated, and for 16% of the CDN-hosted websites, which are felt faster than what PLT indicated. This result is due to two reasons. First, as discussed above, PLT is not perfect and does not take into account how the page is actually rendered on screen. Second, humans are not perfect either; note that the two CDFs show that 20% of the uPLT reduction values are comprised within ±200 ms, a value very hard to judge by the human eye. The figure also shows large uPLT reduction values, e.g., 60% comprised between half a second and 4-5 seconds where, we can blindly trust the input from the human eye. Similarly, we observe high PLT degradation values for two CDN-hosted websites; we visually inspected these videos and indeed observed that some advertisements, by design ignored by Web-LEGO, are responsible for the webpage to complete later. Interestingly, few users did not consider this to be an issue and reported much faster "ready to be used" values.

Normalized Benefit.

Figure 6C:
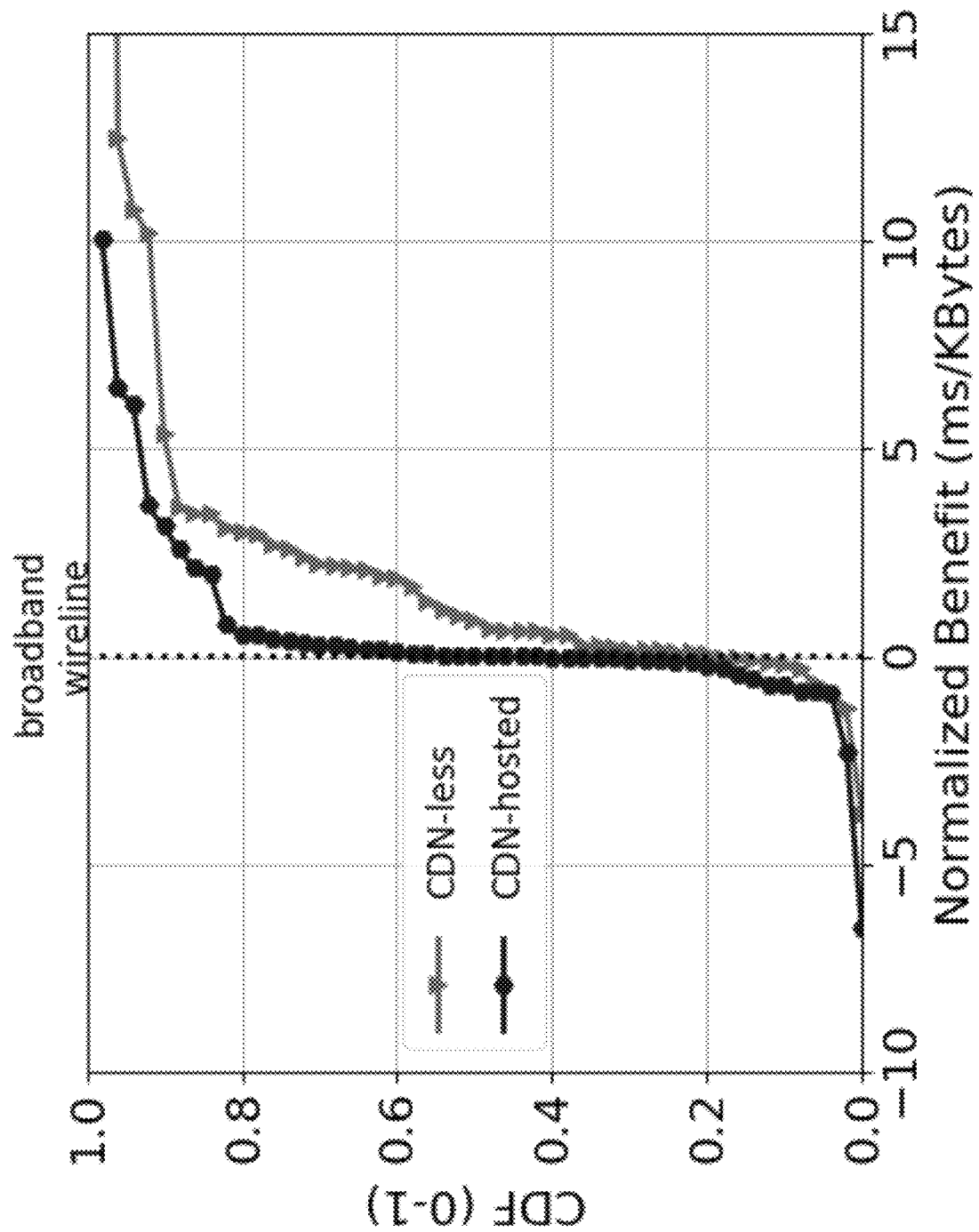

To further understand the result above, FIG. 6C shows the CDF of Web-LEGO's normalized benefit distinguishing between CDN-less and CDN-hosted websites. The normalized benefit was discussed to quantify the break-even points for a client choosing to send extra requests, measured in terms of the amount of improved performance (milliseconds) to the amount of added traffic (KBytes). In the most relevant scenario for our experiments here, i.e., a broadband wireline service, the model implies that as long as extra traffic induced by the client generates the benefit of at least 0.029 ms/KB, it pays of economically for the client to generate extra utilization. We plot this value as a vertical line at x=0.029 in FIG. 6(c).

The figure shows that Web-LEGO's normalized benefit is above the 0.029 threshold in most cases, i.e., 80% of CDN-less cases and in 58% of CDN-hosted cases. The significant benefits, particularly for CDN-less websites, imply that there is additional room for increasing the number of requests for alternative content. At the same time, the results for CDN-hosted websites imply that a more conservative approach should be taken. This is because normalized benefit is only slightly above the threshold in most cases. While the value of 3 additional requests provides a reasonable trade-off in this particular scenario, we conclude that a more fine-grained method, capable of dynamically adjusting the amount of additional traffic on-the-fly, would provide additional benefits.

Such fine-grained method would determine the right level of request redundancy based, for example, on the PLT of a particular website, Web-LEGO setup, the underlying network type, and whether a website is hosted on a CDN or not. Moreover, in resource constrained scenarios it might not be beneficial to replace every single object, even if alternative sources are available. In such a case, it would be necessary to select a subset of the replaceable objects, further raising the question which objects are more important than others in the context of user perception.

Thorough Network Experiments

So far, we have considered a Web-LEGO client connected to a broadband wireline network (up to 100 Mbps in both upload and download) which is accommodating towards Web-LEGO's extra traffic. We here evaluate the impact of worsen network conditions, i.e., slower speed, higher latency and losses, on Web-LEGO's performance. We select two scenarios representative of 4G and 3.5G connectivity, respectively, in terms of download bandwidth. For 4G, we limit the download bandwidth to 19 Mbps; we computed this value as the average download speed for 9 LTE networks in the US, based on a recent study. For 3.5G, we set the download rate to 5 Mbps, according to. For this analysis, we focus on the 50 CDN-less websites.

Figure 7:
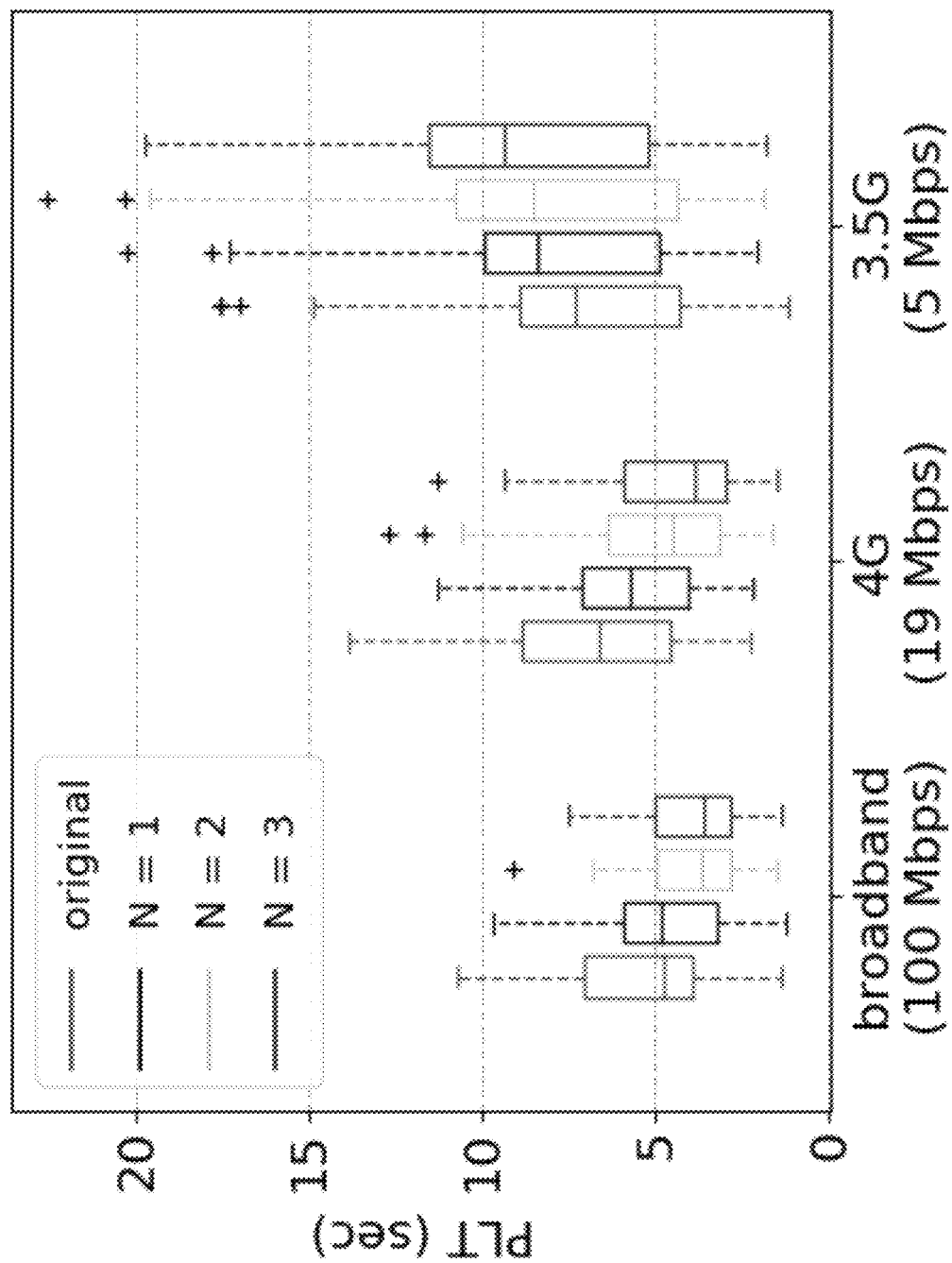
FIG. 7 depicts boxplots of page load times for CDN-less websites over different networks.

FIG. 7 shows boxplots of the PLT as a function of the network connectivity (broadband, 4G, and 3.5G) as well as N, or the maximum number of additional parallel content requests sent by the Web-LEGO's client for each replaceable object. We denote as "original" the PLT of a website when loaded directly. Differently from above (see FIG. 6) we plot the PLT instead of the PLT reduction to highlight the PLT variation in presence of variable network connectivity.

FIG. 7 shows that Web-LEGO is beneficial in both the broadband and 4G scenarios. In particular, as the number of additional requests grows, the performance improves. Despite the additional traffic downloaded in such scenarios, no significant congestion occurs in the download direction. Hence, the Web-LEGO client manages to utilize a larger number of alternative sources to reduce latency and improve performance. We notice that the improvement relative to the original case is larger in the 4G case, which is more constrained than the broadband one. For example, the N=3 median case improves upon original by 20% in the broadband scenario, and by 45% in the 4G scenario.

FIG. 7 shows that in the case of a 3.5G network, characterized with a download speed of 5 Mbps, requesting alternative content is decremental. As a result, the PLT increases. For example, for N=1, it increases by 14% in the median case, and for N=3, it increases by 28%.

In the 3.5G scenario, the additional traffic fetched by a Web-LEGO client creates short-term congestion in the downlink direction, which effectively degrades the overall performance, including the performance of the connections to the origin servers. In these or worse network conditions, Web-LEGO has several options: a Web-LEGO client could either refrain from sending alternative requests. In some embodiments, Web-LEGO could implement fine-grained algorithms that would opportunistically select a subset of replaceable objects.

Normalized Benefit.

FIG. 7 shows that Web-LEGO provides clear and substantial performance benefits in the mobile broadband scenario. Here, we explore if such performance improvements are of sufficient economic benefit to the clients. We again refer to the cost-benefit analysis of low latency via added utilization which found that, in the case of a mobile broadband plan, the normalized benefit should be above a 0.74 ms/KB threshold in order to be economically viable.

Figure 8:
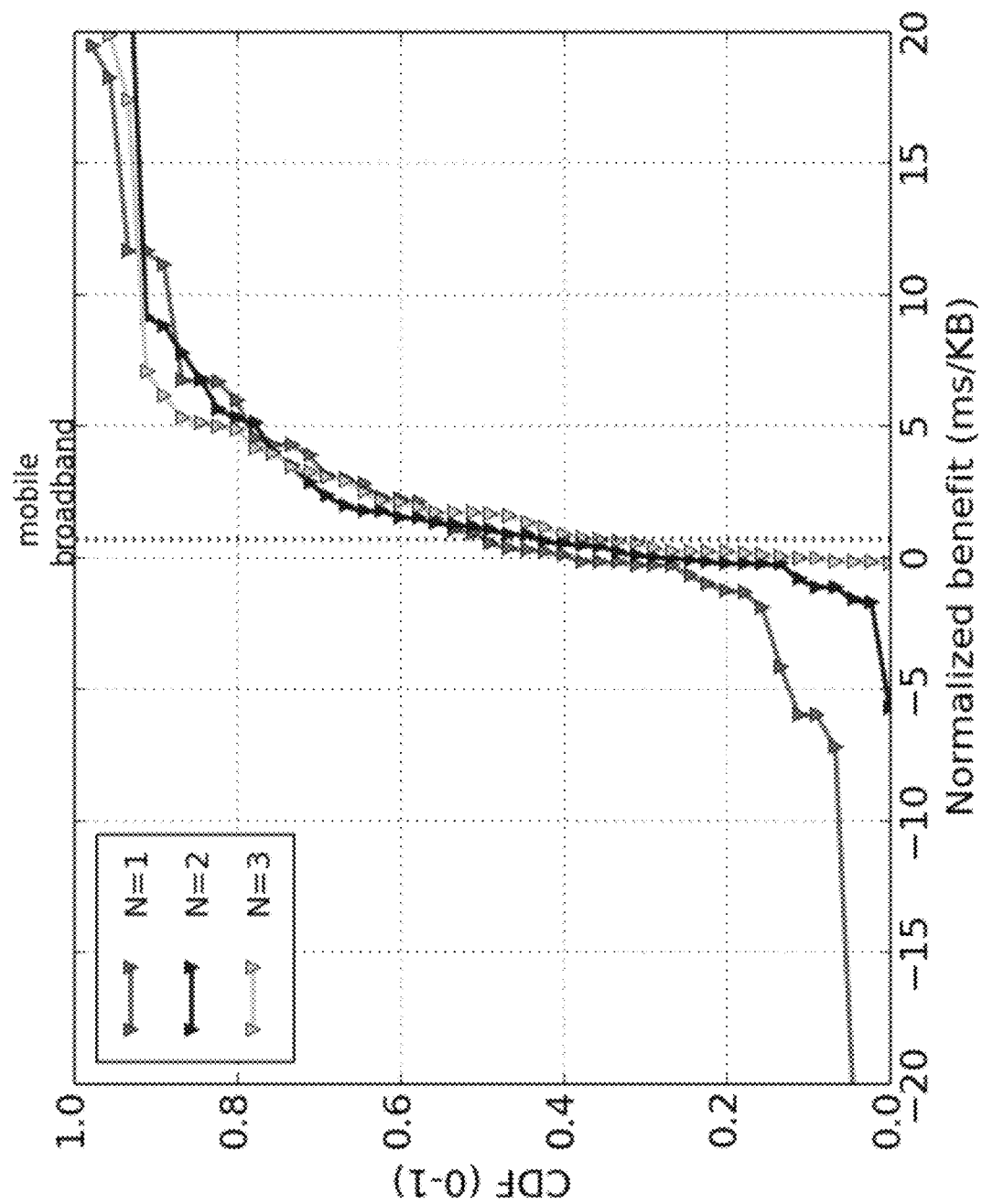
FIG. 8 depicts a normalized benefit of various aspects described herein in a mobile broadband service.

FIG. 8 shows Web-LEGO's normalized benefit in 4G, i.e., the 19 Mbps LTE mobile broadband service. As a reference point, we add the x=0.74 line in the figure, which corresponds to the economic break-even point discussed above. The figure shows that for all numbers of added requests per object, the benefit is still larger than 50%. Most importantly, the figure shows that N=3 not only brings the largest benefit, i.e., in more than 62% of scenarios, but despite the larger overhead (i.e., on average 3× relative to the N=1 case), it manages to bring the corresponding PLT reduction. Hence, it still remains the most viable option in this particular broadband wireless scenario.

As a minor note, we investigated the long negative tail shown in FIG. 8, for N=1. We found that it is induced by a poorly-responsive ad server associated with one of investigated websites. While Web-LEGO did not interfere with the objects at this ad server, this nonetheless inflated the measured PLT. On top of that, the amount of alternative content fetched by Web-LEGO was only 7 KBytes, which caused the long negative tail.

Figure 9:
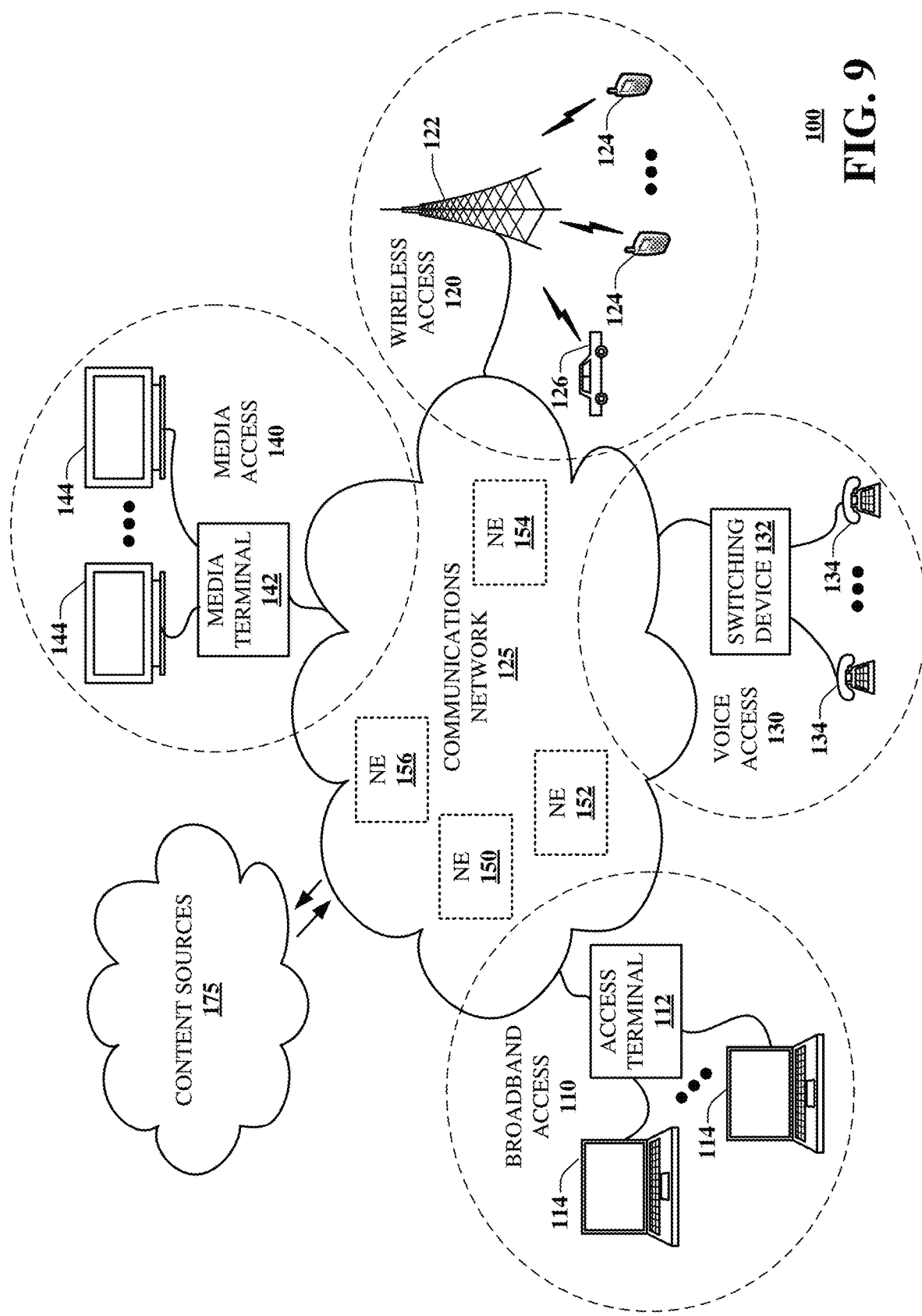
FIG. 9 is a block diagram illustrating an example, non-limiting embodiment of a communications network in accordance with various aspects described herein.

Referring now to FIG. 9, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11 ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 10A:
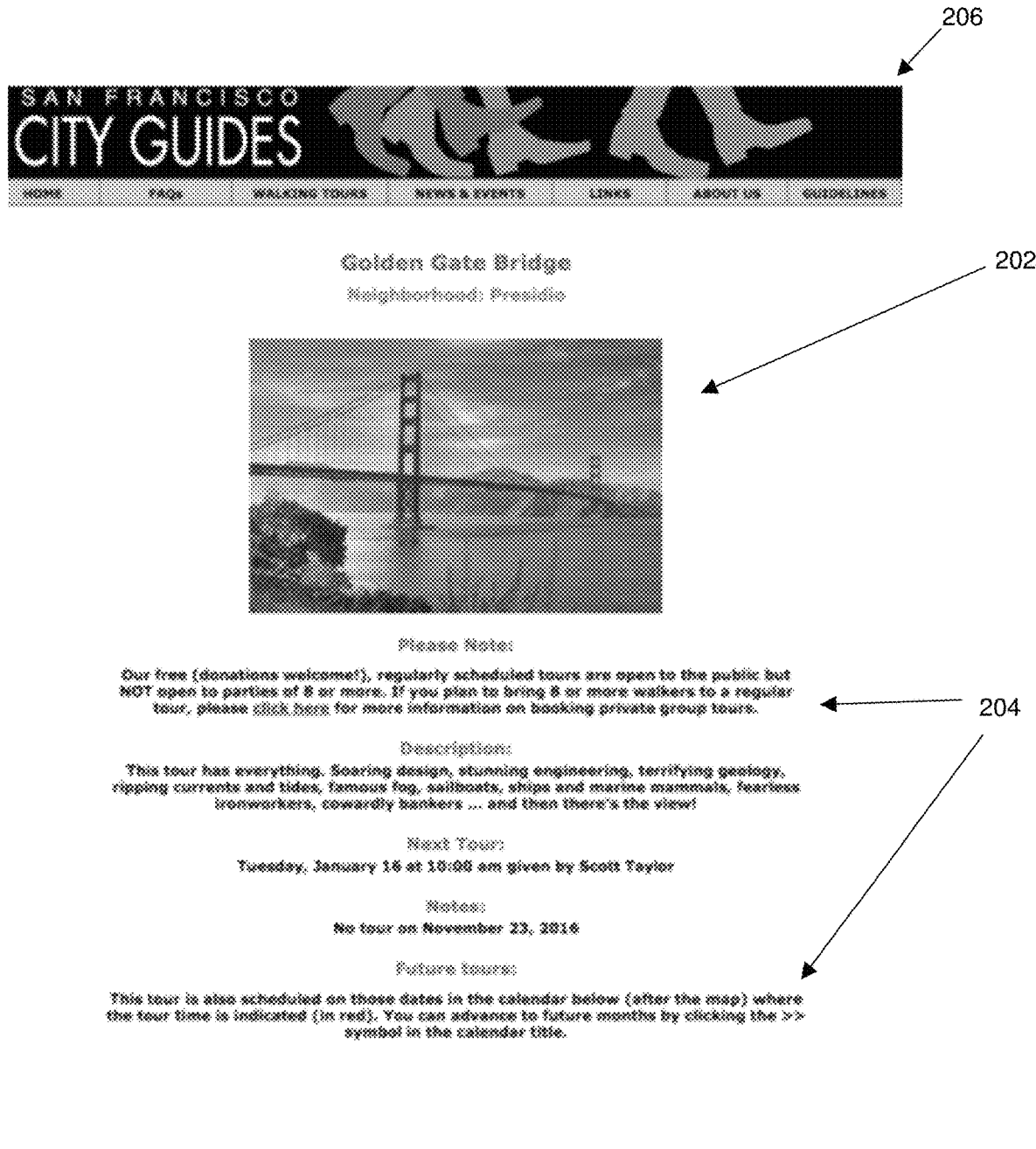
FIG. 10A is a diagram illustrating an example, non-limiting embodiment of a presentation of media content, such as a web page, that may be requested using a system functioning within the communication network of FIG. 9 in accordance with various aspects described herein.

FIG. 10A is a diagram illustrating an example, non-limiting embodiment of a presentation of media content, such as a web page 200, that may be requested through the disclosed embodiments. As shown, the content 200 may include multiple portions or components. As a non-limiting example, the content 200 may include a graphical portion 202, a textual portion 204, portions combining graphical and textual content (such as banner 206), and/or other portions. Some portions, such as graphical portion 202, may be rather large and/or otherwise take a long time and/or a lot of data to retrieve from its original source. A user requesting the content 200 may not be concerned with precise details of these portion(s). In some embodiments, the user requesting the content 200 may actually prefer alternative, or substitute images, especially where the alternative, or substitute images may be retrieved quicker and/or through the use of less data. Other portions, such as the textual portion 204, may convey specific information and, as such may be desirable to retrieve from the original source and/or in original form or content. Still other portions, such as banner 206, may be a combination of the two, and/or contain links or other scripts, components of which may be retrieved from the original source. IT should be understood that the content 200 may include any number of portions, some of which may be replaced with substitutes and others of which may be desirable to retrieve from the original source and/or in original form.

As discussed above, obtaining the content 200 from its original source may take longer, or more data, than desired. Therefore, as discussed above, one or more portions of the content 200, or alternatives to, or substitutes for, one or more portions of the content 200 may be retrieved from alternative sources. Those portions of the content 200 retrieved from alternative sources may or may not be exactly the same as the original portions of the content from the original source.

Figure 10B:
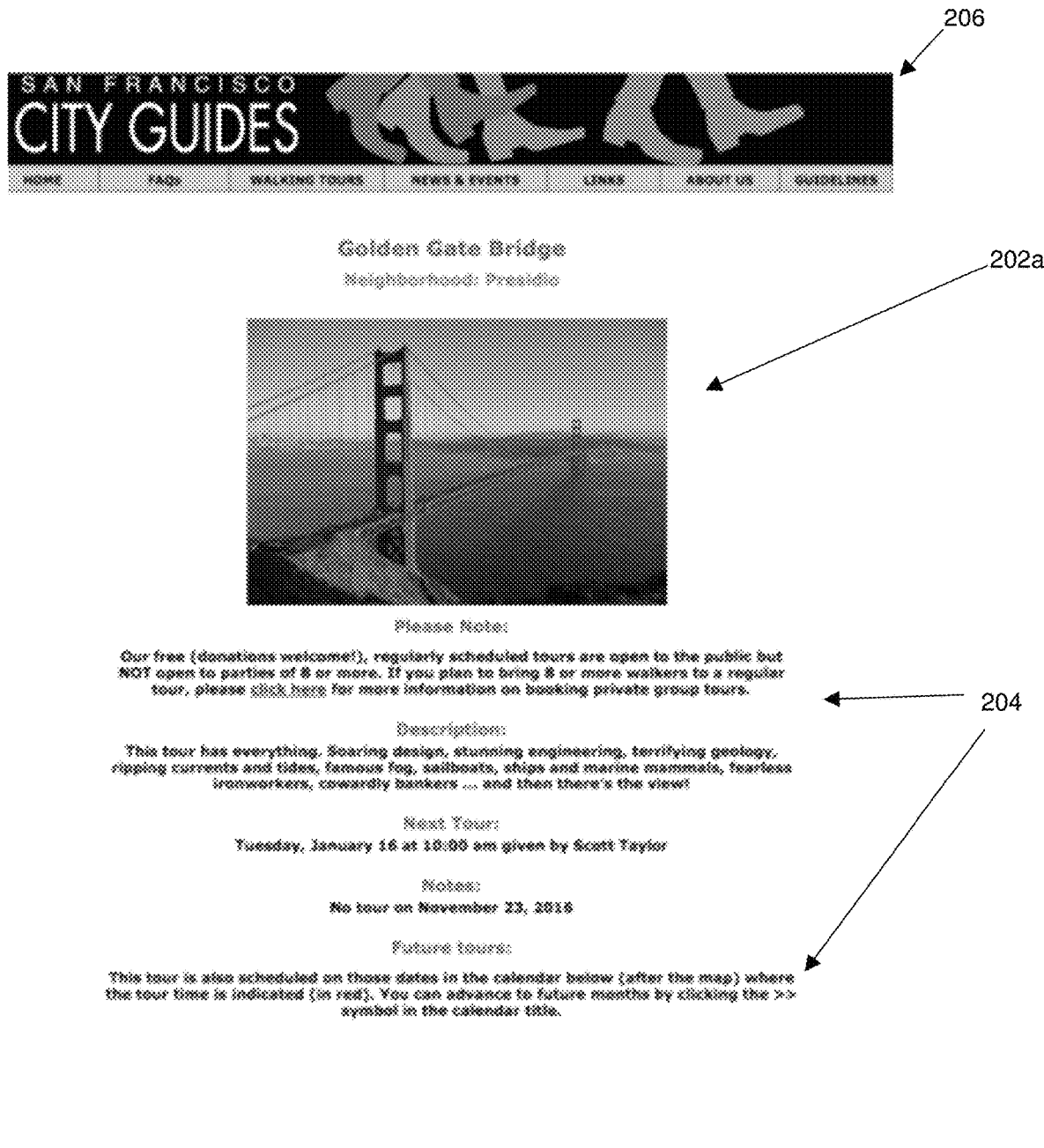
FIG. 10B is a diagram illustrating an example, non-limiting embodiment of an alternative presentation to that of FIG. 10A in accordance with various aspects described herein.

For example, as shown in FIG. 10B, depicts an alternative presentation 200a of content 200 that may be presented through some disclosed embodiments. It can be seen that the textual portion 204 is identical in the alternative presentation 200a and the originally requested content presentation of FIG. 10A. In some embodiments, the textual portion 204 portion may not be exactly identical.

Comparing FIG. 10B with FIG. 10A, it can be seen that the graphical portion 202a is not identical to the graphical portion 202. As shown, the graphic portion 202a is similar to the graphical portion 202. For example, the graphic portion 202a is an image of the same object as in the graphical portion 202, but from a slightly different perspective and possibly taken at another time. The graphic portion 202a may be similar to the graphical portion 202, in that it may be an image of the same or similar object. The graphic portion 202a may be similar to the graphical portion 202, in that it may be an image taken from the same, a similar, or completely different perspective. The graphic portion 202a may be similar to the graphical portion 202, in that it may be an image taken at the same, a similar, or completely different time. The graphic portion 202a may be similar to the graphical portion 202, in that it may focus on the same or similar primary object, with different background or secondary objects. The graphic portion 202a may be similar to the graphical portion 202, in that it may be a similar graphical object. In this manner, the graphic portion 202a may be an alternative to, or substitute for, the graphical portion 202. The adequacy of any similarity between the content 200 and alternatives thereto, or substitutes therefor, is discussed above.

Comparing FIG. 10B with FIG. 10A, it can be seen that another portion 206, appears identical in both the alternative presentation 200a and the originally requested content 200. This other portion 206 may contain graphics, text, links and/or other scripts. As such, in some embodiments, some or all of the components of the other portion 206 may identical and retrieved from either the original source or one or more alternative sources. In some embodiments, some or all of the components of the other portion 206 need not be identical and may be retrieved from one or more alternative sources.

Figure 10C:
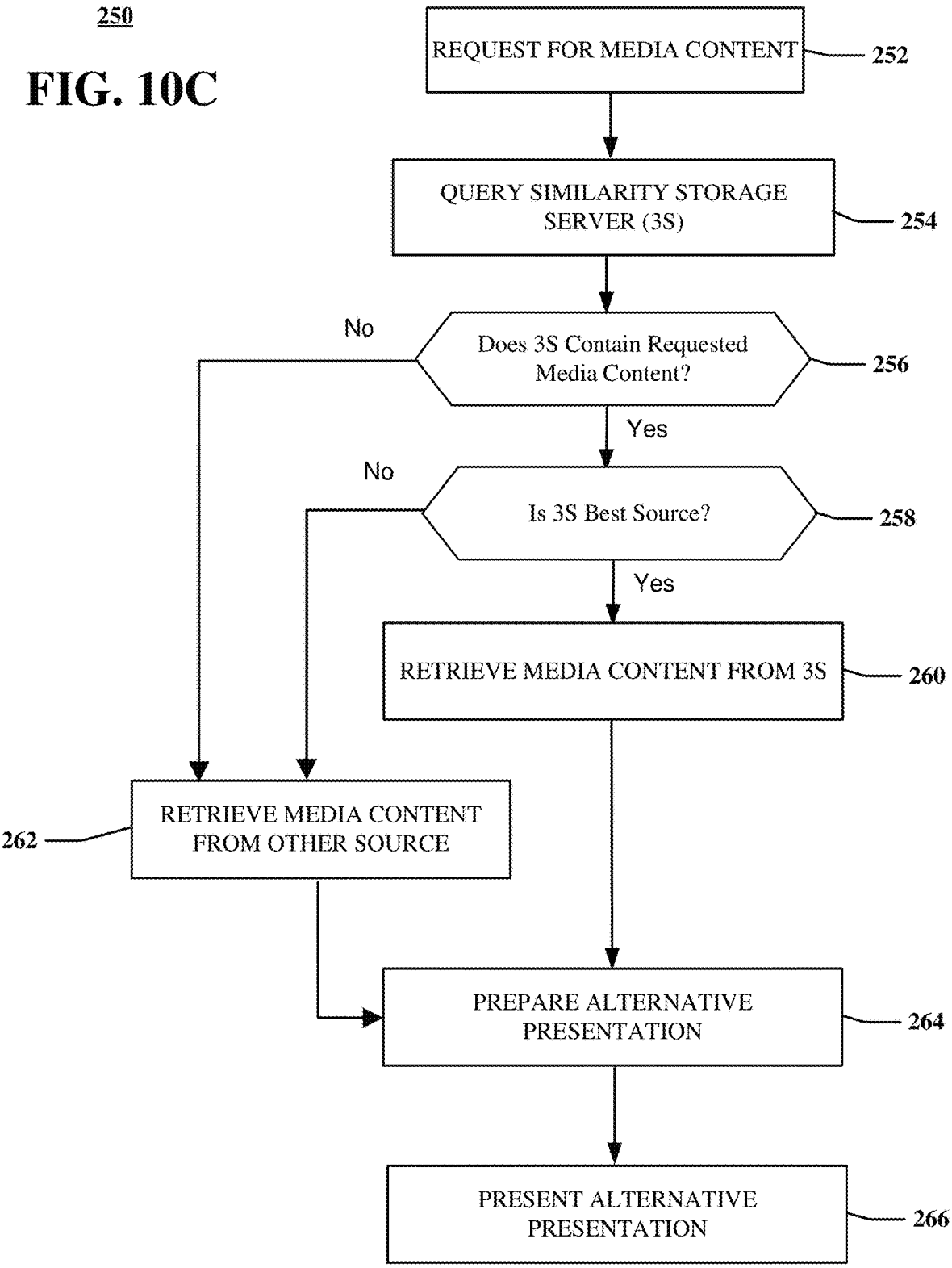
FIG. 10C depicts an illustrative embodiment of a method in accordance with various aspects described herein.

FIG. 10C depicts an illustrative embodiment of a method 250 in accordance with various aspects described herein. As shown in 252, a user may request content 200. The client 10 receives, intercepts, or otherwise detects the request for content 200. In some embodiments, the request for content comprises a request for a specific URL, or otherwise includes a URL. The request may specify an original source for the content 200, which may also be available through one or more CDNs.

As shown in 254 and 256, the client 10 may query the 3S 20 for alternative or substitute versions of the content 200 or portion(s) thereof. If the 3S 20 contains one or more alternative or substitute versions of the content 200 or portion(s) thereof, a determination may be made whether the 3S 20 can provide the one or more alternative versions of the content 200 or portion(s) thereof faster or more efficiently than the original source, or the one or more CDNs, as shown in 258. These determinations may be made for each portion of the content 200 and/or each component of each portion of the content 200.

For example, in some embodiments, the system may download the various portions (or pieces thereof) from various sources in order to determine the carious download times. In some embodiments, the system may estimate download times based on responsiveness of the various sources and/or network quality, bandwidth, congestion, etc.

In some cases, the 3S 20 may be, or have one or more pointers (such as URLs) to, a more efficient source for the content 200, portion(s) thereof, and/or an alternative to, or substitute for, the content 200 or portion(s) thereof. Where the 3S 20 is a better source for the content 200, portion(s) thereof, and/or an alternative to, or substitute for, the content 200 or portion(s) thereof, the content 200, portion(s) thereof, and/or an alternative to, or substitute for, the content 200 or portion(s) thereof is/are retrieved or otherwise obtained from the 3S 20, as shown in 260.

As discussed above, in some cases, it may be more efficient or otherwise desirable to retrieve the content 200 or portion(s) thereof from the original source or the one or more CDNs, as shown in 262. This may be because the original source or the one or more CDNs can simply provide the content more efficiently. This may be because it is otherwise desirable to retrieve one or more portions of the content 200 from the original source or the one or more CDNs, due to their nature (such as being textual, a link, or a script, etc.), as discussed above.

In any case, while not necessarily required for every embodiment, it is anticipated that one or more portions of the content 200 will be retrieved from the original source or the one or more CDNs. As shown in 264, the different portions of the content, possibly received from different sources, are assembled into an alternative presentation 200a. The alternative presentation 200a is presented to the user, as shown in 266.

As discussed above, in some cases, the entirety of the content 200 will be retrieved, as originally requested, from the original source or the one or more CDNs. In this case, the content 200, as originally requested, will be presented, with no alternative or substitute portions.

Figure 10D:
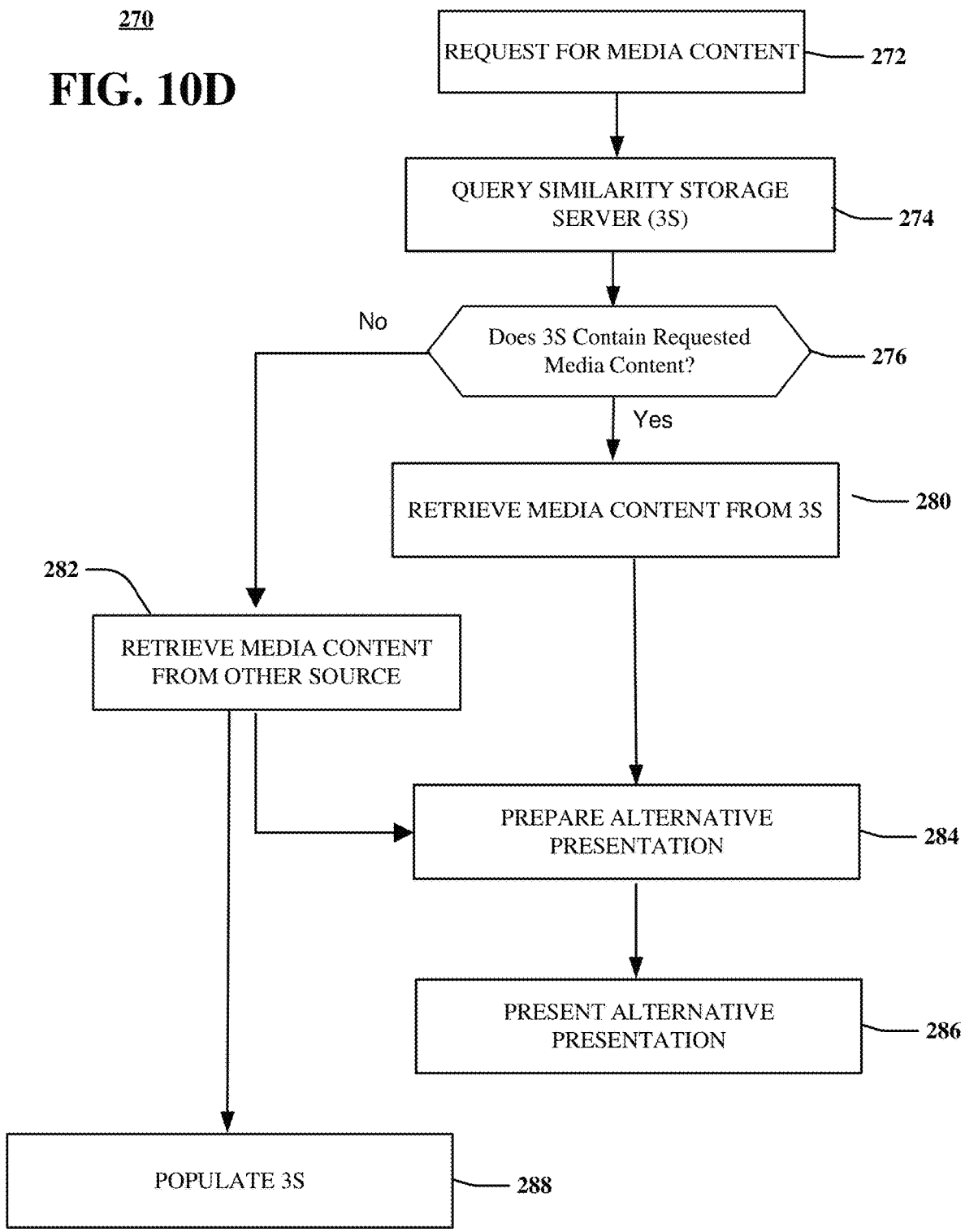
FIG. 10D depicts an illustrative embodiment of another method in accordance with various aspects described herein.

FIG. 10D depicts an illustrative embodiment of a method 270 in accordance with various aspects described herein. As shown in 272, a user may request content 200. The client 10 receives, intercepts, or otherwise detects the request for content 200. In some embodiments, the request for content comprises a request for a specific URL, or otherwise includes a URL. The request may specify an original source for the content, which may also be available through one or more CDNs.

As shown in 274 and 276, the client 10 may query the 3S 20 for alternative or substitute versions of the content 200 or portion(s) thereof. If the 3S 20 contains (or contains pointer(s) to) one or more alternative or substitute versions of the content 200 or portion(s) thereof, the content 200, portion(s) thereof, and/or an alternative to, or substitute for, the content 200 or portion(s) thereof is/are retrieved or otherwise obtained from the 3S 20, as shown in 280.

While not necessarily required for every embodiment, it is anticipated that one or more portions of the content 200 (and/or an alternative to, or substitute for, the content 200 or portion(s) thereof) will be retrieved from the original source, the one or more CDNs, or some other source, as shown in 282. In any case, as shown in 284, the different portions of the content, possibly received from different sources, are assembled into an alternative presentation 200a. The alternative presentation 200a is presented to the user, as shown in 286.

As discussed above, where the 3S 20 does not include alternative or substitute portions of the content 200, or pointer(s) thereto, the RFSS 30 may perform a reverse file search for alternative or substitute portions of the content 200. This may be done as part of retrieving one or more portions of the content 200, (and/or an alternative to, or substitute for, the content 200 or portion(s) thereof), as shown in 282. Then, the 3S 20 may also be populated with the one or more portions of the content 200 and/or an alternative to, or substitute for, the content 200 or portion(s) thereof, as shown in 288.

While for purposes of simplicity of explanation, the respective processes are shown and described as a series of blocks in FIGS. 10C and 10D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein. Furthermore, the methods 250 and 270 of FIGS. 10C and 10D are not necessarily mutually exclusive. For example, the method 250 may include population of the 3S 20, as shown in 288. Similarly, the method 270 may include a determination as the whether the 3S 20 is (or contains pointer(s) to) the best source of any portion of the content, as shown in 258.

Figure 11:
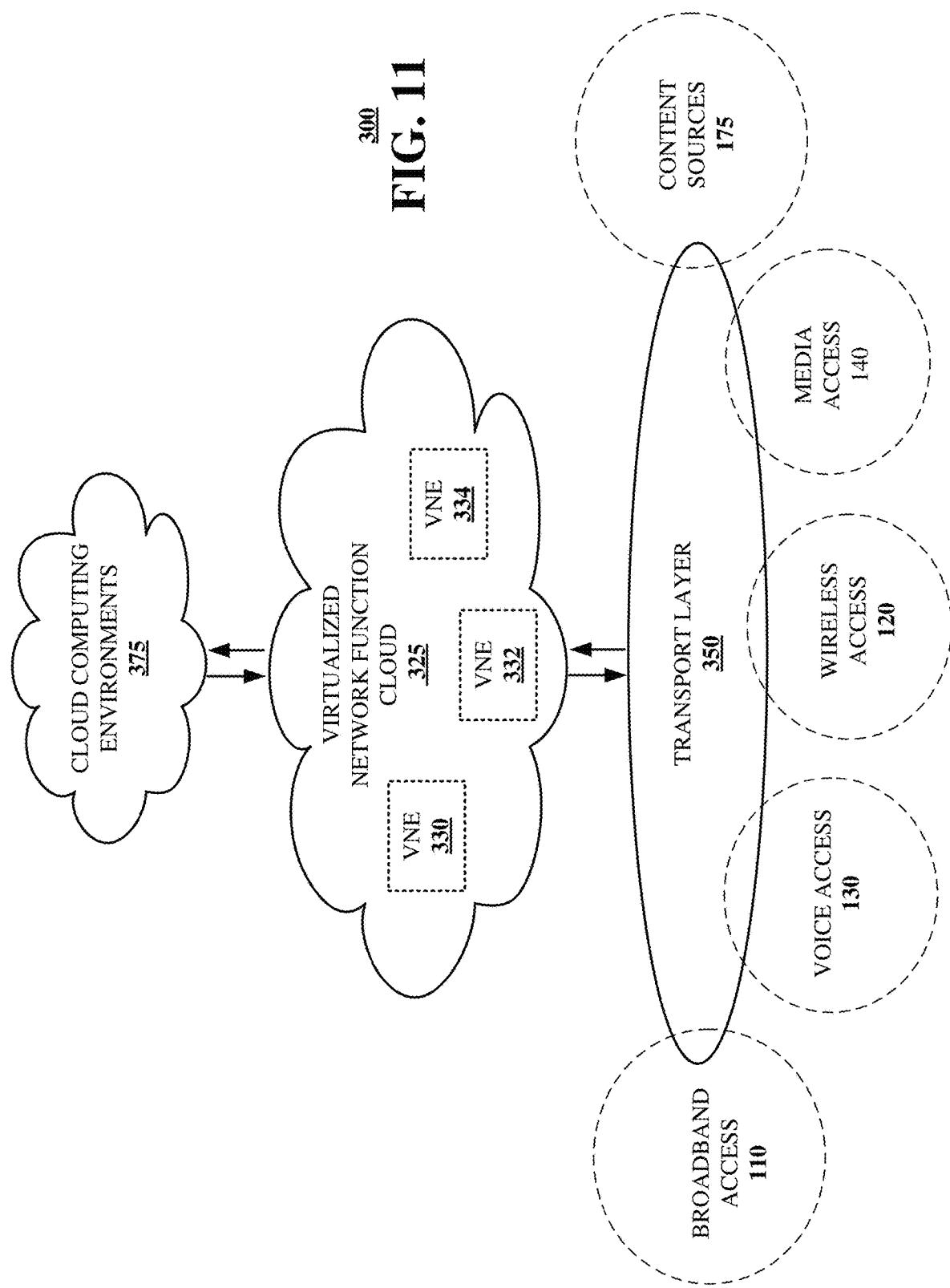
FIG. 11 is a block diagram illustrating an example, non-limiting embodiment of a virtualized communication network in accordance with various aspects described herein.

Referring now to FIG. 11, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the client 10, the similarity storage server 20, the reverse file search server 30, the Internet 40, method 250, and/or method 270 presented in FIGS. 3, 4, 9, 10C and/or 10D. For example, the virtualized communication network 300 may provide communications with the various sources of content, as described above.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a virtual network element 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as virtual network elements 330, 332 or 334. These network elements can be included in transport layer 350.

The virtualized network function cloud 325 interfaces with the transport layer 350 to provide the virtual network elements 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, virtualized network elements 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributors and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNE 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 12:
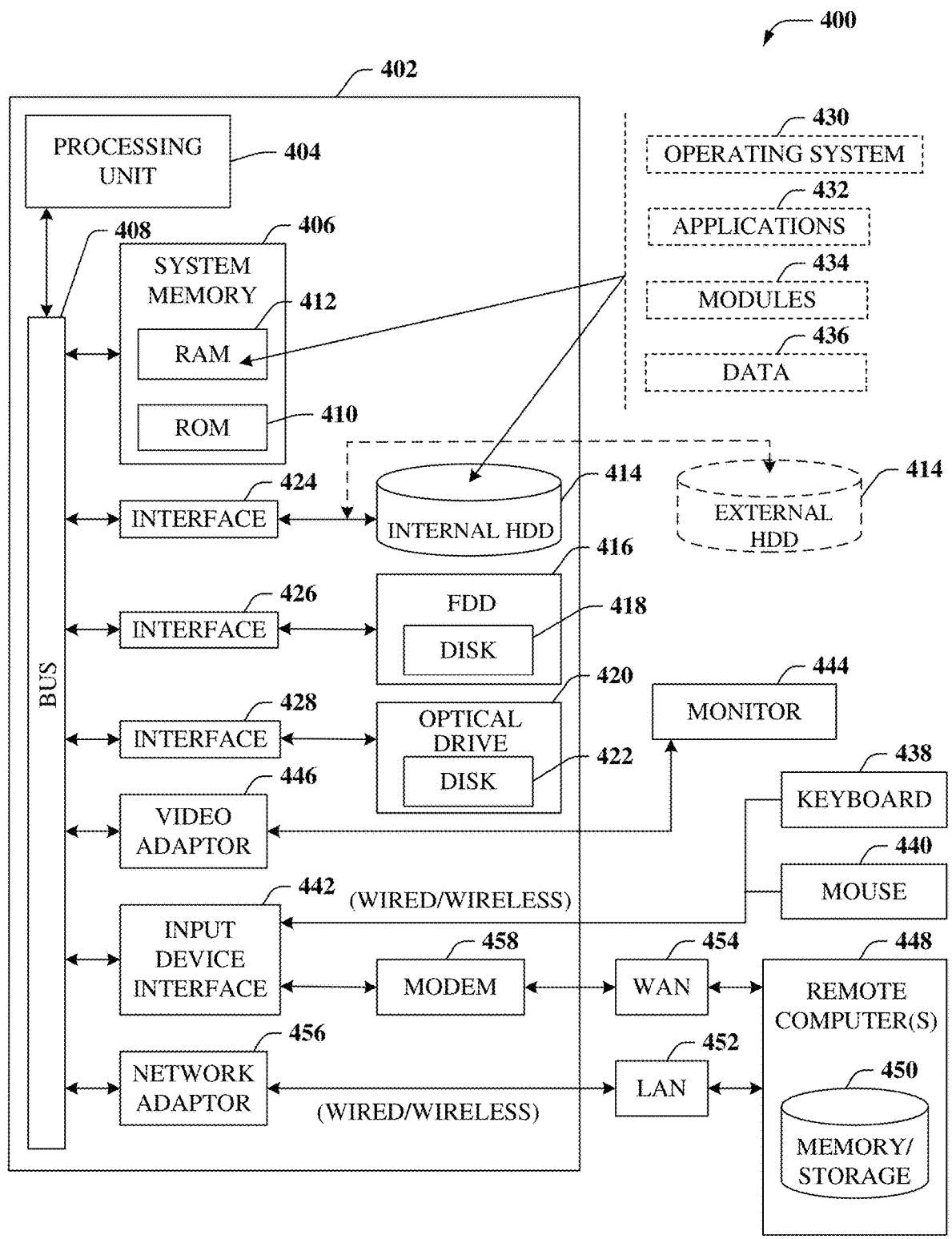
FIG. 12 is a block diagram of an example, non-limiting embodiment of a computing environment in accordance with various aspects described herein.

Turning now to FIG. 12, there is illustrated a block diagram of a computing environment in accordance with various aspects described herein. In order to provide additional context for various embodiments of the embodiments described herein, FIG. 12 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or virtual network elements 330, 332, 334, etc. Each of these devices can be implemented via computer-executable instructions that can run on one or more computers, and/or in combination with other program modules and/or as a combination of hardware and software. The computing environment 400 may be used in connection with, or provide the functionality of the client 10, the similarity storage server 20, and/or the reverse file search server 30, as discussed above.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal hard disk drive 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the local network 452 through a wired and/or wireless communication network interface or adapter 456. The adapter 456 can facilitate wired or wireless communication to the LAN 452, which can also comprise a wireless AP disposed thereon for communicating with the wireless adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 13:
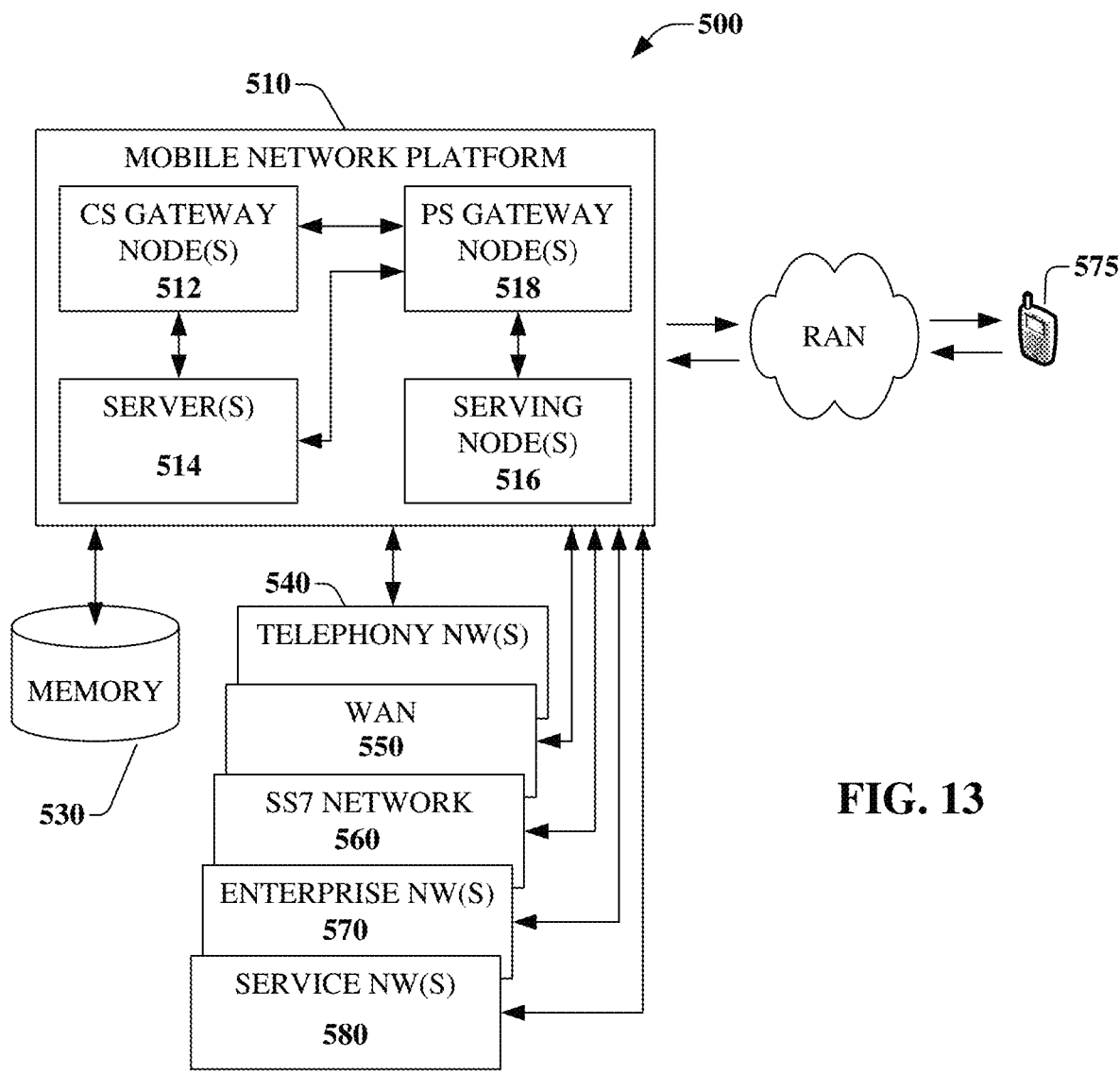
FIG. 13 is a block diagram of an example, non-limiting embodiment of a mobile network platform in accordance with various aspects described herein.

Turning now to FIG. 13, an embodiment 500 of a mobile network platform 510 is shown that is an example of network elements 150, 152, 154, 156, and/or virtual network elements 330, 332, 334, etc. The mobile network platform 510 may provide communications between the client 10, the similarity storage server 20, and/or the reverse file search server 30, as discussed above. In one or more embodiments, the mobile network platform 510 can generate and receive signals transmitted and received by base stations or access points such as base station or access point 122. Generally, wireless network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 570. Circuit switched gateway node(s) 512 can authorize and authenticate traffic (e.g., voice) arising from such networks. Additionally, CS gateway node(s) 512 can access mobility, or roaming, data generated through SS7 network 570; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the wireless network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 560 can embody, at least in part, a service network(s) like IP multimedia subsystem (IMS). Based on radio technology layer(s) available in technology resource(s) 517, packet-switched gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTIG) in 3GPP UMTS network(s) (not shown)) which can facilitate packetized communication with disparate wireless network(s), such as Wi-Fi networks.

In embodiment 500, wireless network platform 510 also comprises serving node(s) 516 that, based upon available radio technology layer(s) within technology resource(s) 517, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in wireless network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by wireless network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through wireless network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to wireless network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of macro wireless network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of wireless network platform 510. Other operational information can comprise provisioning information of mobile devices served through wireless platform network 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, enterprise network(s) 570, or SS7 network 560. In an aspect, memory 530 can be, for example, accessed as part of a data store component or as a remotely connected memory store.

In order to provide a context for the various aspects of the disclosed subject matter, FIG. 13, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 14:
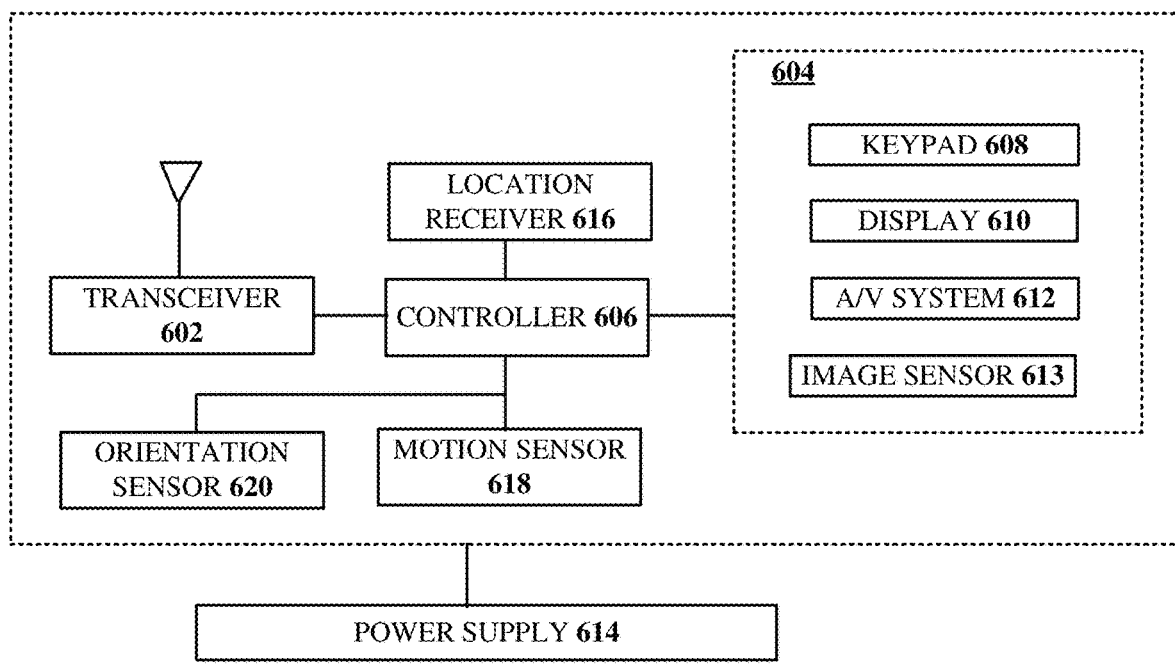
FIG. 14 is a block diagram of an example, non-limiting embodiment of a communication device in accordance with various aspects described herein.

Turning now to FIG. 14, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. The client 10 may reside, or otherwise function, on the communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 14 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
receiving, by a client device including a processing system comprising a processor, a request for content, the content including a first portion and a second portion, wherein the content is associated with an origin source of both the first portion and the second portion;
querying, by the processing system, an associated server for the first portion and the second portion, wherein the associated server and the client device cooperate to provide an opt-in web service for providing content items to the client device with improved delivery performance for the content in exchange for delivered content having a different appearance;
retrieving, by the processing system, the first portion;
identifying, by the processing system, an alternative source for an alternative portion, the alternative portion being a substitute for the second portion, wherein the identifying the alternative source is based on a reverse file search for the second portion;
retrieving, by the processing system, the alternative portion from the alternative source, the alternative portion having an appearance differing from an appearance of the second portion, wherein the retrieving the alternative portion is performed in response to determining, by the processing system, that retrieving the second portion from the origin source would take a first time period, determining, by the processing system, that the retrieving the alternative portion would take a second time period, and determining, by the processing system, that the second time period is less than the first time period;

assembling, by the processing system, an alternative presentation by combining the first portion and the alternative portion; and presenting, by the processing system, the alternative presentation in response to the receiving the request for content.

2. The method of claim 1, wherein the retrieving the first portion comprises retrieving the first portion from the origin source and wherein retrieving the alternative portion comprises retrieving the alternative portion from the alternative source, and wherein the alternative source is not the origin source.

3. The method of claim 2, wherein the alternative portion is different from the second portion and wherein the alternative source comprises the associated server.

4. The method of claim 1, wherein the first portion is textual and retrieved from the origin source such that the first portion presented as part of the alternative presentation is the first portion of the content requested in the request for content.

5. The method of claim 1, wherein the second portion is graphical, wherein the alternative portion is graphical and retrieved from the alternative source, wherein the alternative portion is related to the second portion, wherein the alternative portion is different from the second portion, and wherein the alternative source is not the origin source.

6. The method of claim 1, wherein the request includes a first Uniform Resource Locator, wherein the first portion is retrieved through the first Uniform Resource Locator, wherein the second portion is retrieved through a second Uniform Resource Locator, and wherein the first Uniform Resource Locator is different from the second Uniform Resource Locator.

7. The method of claim 1, wherein the first portion is retrieved from a first source, wherein the first source is not the origin source, and wherein the first portion presented as part of the alternative presentation is the first portion of the content requested in the request for content.

8. The method of claim 1, wherein the second portion is a first image of an object, wherein the alternative portion is a second image of the object retrieved from the alternative source, wherein the alternative portion is different from the second portion, and wherein the alternative source is not the origin source.

9. The method of claim 1, wherein the identifying the alternative source for the alternative portion comprises submitting, by the processing system, the second portion to a reverse file search server and receiving, by the processing system, from the reverse file search server, one or more objects including information identifying the alternative source.

10. An apparatus, comprising:
a processor; and
a memory that stores executable instructions that, when executed by the processor, facilitate performance of operations, comprising:
detecting, at a client device, a request for content from an origin source, the content including a first portion and a second portion;
querying, by the client device, an associated server for the first portion and the second portion, wherein the associated server and the client device cooperate to provide an opt-in web service for providing content items to the client device with improved delivery performance for the content in exchange for delivered content having a different appearance;
retrieving the first portion;
determining that retrieving the second portion from the origin source would take a first time period;
identifying an alternative source for an alternative portion, the alternative portion being a substitute for the second portion, wherein the identifying the alternative source is based on a reverse file search of a network for the second portion;
determining that retrieving the alternative portion from the alternative source would take a second time period, wherein the alternative portion is related to, but different from, the second portion, wherein the alternative portion has an appearance differing from an appearance of the second portion;
responsive to determining that the second time period is less than the first time period, retrieving the alternative portion from the alternative source;
assembling an alternative presentation by combining the first portion and the alternative portion; and
presenting the alternative presentation in response to detecting the request for content.

11. The apparatus of claim 10, wherein the first portion is textual and retrieved from the origin source such that the first portion presented as part of the alternative presentation is the first portion of the content requested in the request for content.

12. The apparatus of claim 10, wherein the second portion and the alternative portion are graphical and wherein the alternative source is not the origin source.

13. The apparatus of claim 10, wherein the request includes a first Uniform Resource Locator, wherein the first portion is retrieved through the first Uniform Resource Locator, wherein the second portion is retrieved through a second Uniform Resource Locator, and wherein the first Uniform Resource Locator is different from the second Uniform Resource Locator.

14. The apparatus of claim 10, wherein the first portion is retrieved from a first source, wherein the first source is not the original source, and wherein the first portion presented as part of the alternative presentation is the first portion of the content requested in the request for content.

15. The apparatus of claim 10, wherein the second portion is a first image of an object, wherein the alternative portion is a second image of the object retrieved from the alternative source, wherein the alternative portion is different from the second portion, and wherein the alternative source is not the origin source.

16. A non-transitory, machine-readable medium, comprising executable instructions that, when executed by a processing system including a processor, facilitate performance of operations, the operations comprising:
receiving, at a client device, a request for content from an origin source, the content including a first portion and a second portion;
querying, by the client device, an associated server for the first portion and the second portion, wherein the associated server and the client device cooperate to provide an opt-in web service for providing content items to the client device with improved delivery performance for the content in exchange for delivered content having a different appearance;
retrieving the first portion;
identifying an alternative source for an alternative portion, the alternative portion being a substitute for the second portion, wherein the identifying the alternative source is based on a reverse file search of a network for the second portion;

determining that retrieving the second portion from the origin source would take a first time period;

determining that retrieving the alternative portion from the alternative source would take a second time period, wherein the alternative portion has an appearance differing from an appearance of the second portion;

responsive to determining that the second time period is less than the first time period, retrieving the alternative portion from the alternative source;

assembling an alternative presentation by combining the first portion and the alternative portion; and presenting the alternative presentation in response to receiving the request for content; and responsive to determining that the second time period is greater than the first time period, retrieving the second portion from the origin source;

assembling an original presentation by combining the first portion and the second portion; and presenting the original presentation in response to receiving the request for content.

17. The non-transitory, machine-readable medium of claim 16, wherein the first portion is textual and retrieved from the origin source such that the first portion presented as part of the alternative presentation is the first portion of the content requested in the request for content.

18. The non-transitory, machine-readable medium of claim 16, wherein the request includes a first Uniform Resource Locator, wherein the first portion is retrieved through the first Uniform Resource Locator, wherein the second portion is retrieved through a second Uniform Resource Locator, and wherein the first Uniform Resource Locator is different from the second Uniform Resource Locator.

19. The non-transitory, machine-readable medium of claim 16, wherein the first portion is retrieved from a first source, wherein the first source is not the original source, and wherein the first portion presented as part of the alternative presentation is the first portion of the content requested in the request for content.

20. The non-transitory, machine-readable medium of claim 16, wherein the second portion is a first image of an object, wherein the alternative portion is a second image of the object retrieved from the alternative source, wherein the alternative portion is different from the second portion, and wherein the alternative source is not the origin source.

* * * * *